(12) United States Patent
Cao

(10) Patent No.: US 11,663,383 B2
(45) Date of Patent: May 30, 2023

(54) METHOD AND SYSTEM FOR HIERARCHICAL CIRCUIT SIMULATION USING PARALLEL PROCESSING

(71) Applicant: ICEE Solutions LLC

(72) Inventor: Henry Hongwei Cao, Cupertino, CA (US)

(73) Assignee: ICEE Solutions LLC., Cupertino, CA (US)

( * ) Notice: Subject to any disclaimer, the term of this patent is extended or adjusted under 35 U.S.C. 154(b) by 0 days.

(21) Appl. No.: 17/385,819

(22) Filed: Jul. 26, 2021

(65) Prior Publication Data

US 2021/0357560 A1 Nov. 18, 2021

Related U.S. Application Data

(63) Continuation-in-part of application No. 16/428,703, filed on May 31, 2019, now Pat. No. 11,074,385.

(60) Provisional application No. 62/679,645, filed on Jun. 1, 2018.

(51) Int. Cl.
*G06F 30/3308* (2020.01)
*G06F 30/327* (2020.01)

(52) U.S. Cl.
CPC ........ *G06F 30/3308* (2020.01); *G06F 30/327* (2020.01)

(58) Field of Classification Search
CPC ............................ G06F 30/3308; G06F 30/327
USPC ...................................................... 716/106
See application file for complete search history.

(56) References Cited

U.S. PATENT DOCUMENTS

| 6,577,992 | B1* | 6/2003 | Tcherniaev | G06F 30/367 |
| | | | | 716/136 |
| 6,807,520 | B1* | 10/2004 | Zhou | G06F 30/33 |
| | | | | 716/136 |
| 7,181,383 | B1* | 2/2007 | McGaughy | G06F 30/367 |
| | | | | 716/136 |

(Continued)

FOREIGN PATENT DOCUMENTS

TW I340906 B 4/2011

OTHER PUBLICATIONS

ICEE Solutions LLC, PCT International Search Report, PCT/US2019/035013, dated Aug. 22, 2019, 2 pgs.

(Continued)

*Primary Examiner* — Suchin Parihar
(74) *Attorney, Agent, or Firm* — USCH Law, PC

(57) ABSTRACT

A method for simulating a circuit represented by a top circuit and a plurality of subcircuit instances (SCIs) forming a hierarchy under the top circuit. The method comprises, during an iteration round of one or more iteration rounds, obtaining respective circuit equation parameters for each respective SCI of the plurality of SCIs in a bottom-up process, in which at least some of the circuit equation parameters for a parent SCI are obtained using a portion of the circuit equation parameters for a child SCI of the parent SCI. The method further comprises determining respective signal values of each respective SCI of the plurality of SCIs in a top-down process, where, for each child SCI having internal nets, signal values at internal nets of the child SCI are obtained using one or more signal values determined for a parent SCI and corresponding to one or more signal values at external ports of the child SCI.

20 Claims, 26 Drawing Sheets

(56) References Cited

U.S. PATENT DOCUMENTS

| | | | | |
|---|---|---|---|---|
| 7,555,733 | B1* | 6/2009 | Gee | G06F 30/367 |
| | | | | 716/106 |
| 8,694,302 | B1* | 4/2014 | Ho | G06F 30/392 |
| | | | | 703/2 |
| 10,198,543 | B2* | 2/2019 | Knapp | G06F 30/327 |
| 10,783,292 | B1* | 9/2020 | Clewes | G06F 30/392 |
| 2006/0101358 | A1* | 5/2006 | Shah | G06F 30/33 |
| | | | | 716/136 |
| 2006/0161413 | A1* | 7/2006 | Wei | G06F 30/33 |
| | | | | 703/14 |
| 2007/0157135 | A1* | 7/2007 | Yang | G06F 30/367 |
| | | | | 716/136 |
| 2013/0191805 | A1* | 7/2013 | Lin | G06F 30/20 |
| | | | | 716/136 |
| 2019/0370426 | A1* | 12/2019 | Cao | G06F 30/367 |

OTHER PUBLICATIONS

ICEE Solutions LLC, PCT Written Opinion, PCT/US2019/035013, dated Aug. 22, 2019, 5 pgs.
ICEE Solutions LLC, First Examination Report, CN201980051374.7, dated Nov. 8, 2021, 8 pgs.
ICEE Solutions LLC, Extended European Search Report, EP19810535.5, dated Feb. 15, 2022, 13 pgs.
Anonymous: design—Can recursion be done in parallel? Would that make sense? —Software Engineering Stack Exchange, Retrieved from the Internet: https://softwareengineering.stackexchange.com/questions/238729/can-recursion-be-done-in-parallel-would-that-make-sense, May 11, 2014, 5 pgs.
ICEE Solutions LLC, Second Examination Report, CN201980051374.7, dated Jun. 6, 2022, 3 pgs.
ICEE Solutions LLC, Response to Extended European Search Report, EP19810535.5, dated Dec. 15, 2022, 25 pgs.

* cited by examiner

```
.subckt SCI_11 a b out VDD GND
......
.ends

.subckt SCI_12 in out VDD GND
......
.ends

.subckt SCI_1 a b out VDD GND
x1 a b n2 VDD GND SCI_11
x2 n2 out VDD GND SCI_12
.ends .subckt top in out VDD GND
r1 in n1 100k
c1 n1 GND 100f
x1 n1 GND out VDD GND SCI_1
x2 VDD GND SCI_2
.ends vin in GND dc 0 pulse (0 2.5 53.4n 0.1n 0.1n 53.4n 107n)
.OPTION CONVERGE=1 GMINDC=1.0000E-11...
.tran 0.01ns 120000.0ns
.SAVE ALL
.plot tran v(in) v(n1) v(out)
```

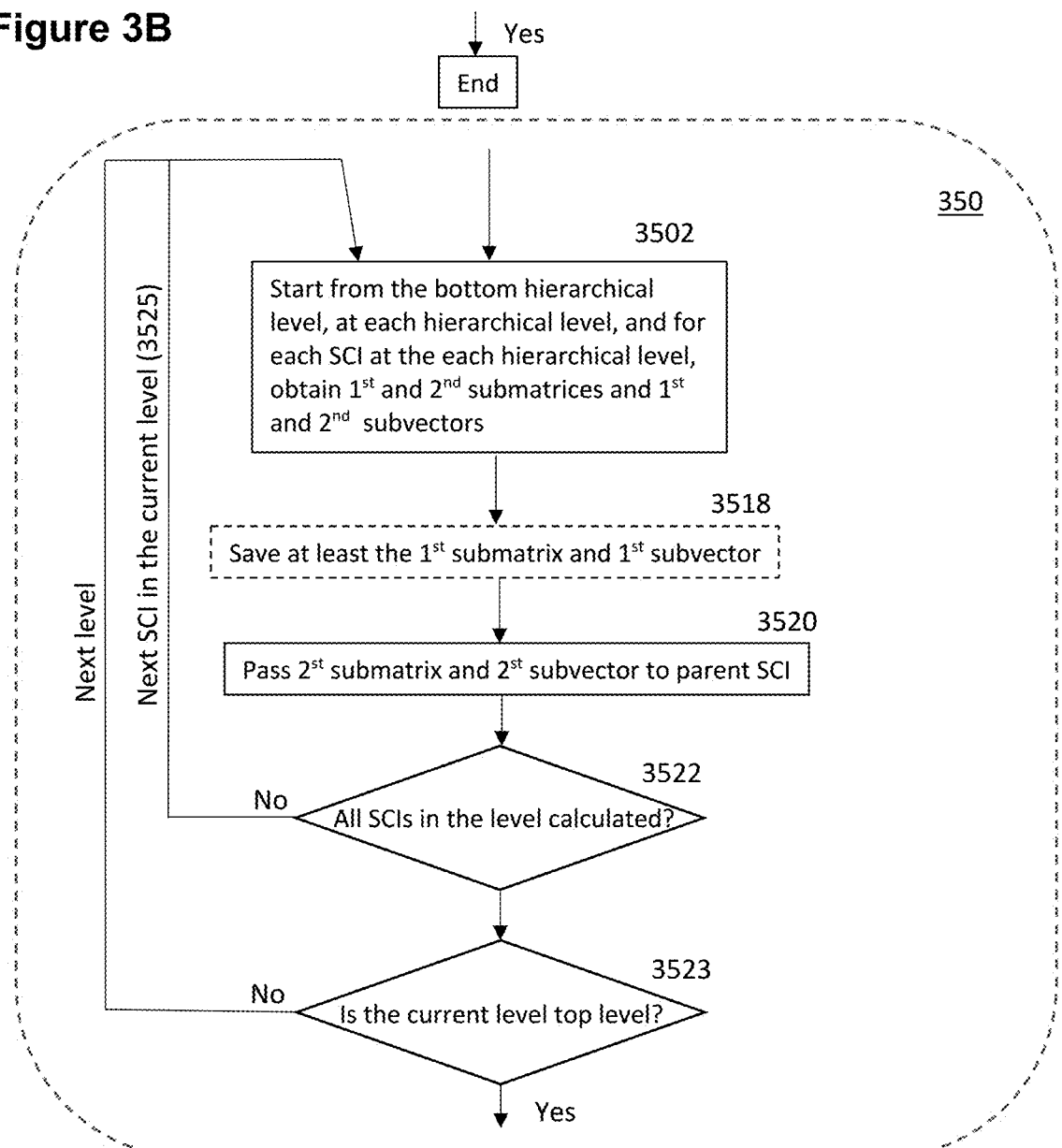

Figure 6A

| Row Order \ Column Order | n1 | n2 | VDD | GND | ... | SCI_11 | | | |
|---|---|---|---|---|---|---|---|---|---|
| n1 | $Ge_{11}^{[11]}$ | $Ge_{11}^{[12]}$ | $Ge_{11}^{[13]}$ | $Ge_{11}^{[14]}$ | $Gei_{11}^{[11]}$ | $Ve_{11}^{[1]}$ | × | $Ie_{11}^{[1]}$ | = |
| n2 | $Ge_{11}^{[21]}$ | $Ge_{11}^{[22]}$ | $Ge_{11}^{[23]}$ | $Ge_{11}^{[24]}$ | $Gei_{11}^{[21]}$ | $Ve_{11}^{[2]}$ | | $Ie_{11}^{[2]}$ | |
| VDD | $Ge_{11}^{[31]}$ | $Ge_{11}^{[32]}$ | $Ge_{11}^{[33]}$ | $Ge_{11}^{[34]}$ | $Gei_{11}^{[31]}$ | $Ve_{11}^{[3]}$ | | $Ie_{11}^{[3]}$ | |
| GND | $Ge_{11}^{[41]}$ | $Ge_{11}^{[42]}$ | $Ge_{11}^{[43]}$ | $Ge_{11}^{[44]}$ | $Gei_{11}^{[41]}$ | $Ve_{11}^{[4]}$ | | $Ie_{11}^{[4]}$ | |
| ... | $Gie_{11}^{[11]}$ | $Gie_{11}^{[12]}$ | $Gie_{11}^{[13]}$ | $Gie_{11}^{[14]}$ | $Gi_{11}^{[11]}$ | $Vi_{11}^{[1]}$ | | $Ii_{11}^{[1]}$ | |

Figure 6B

| Row Order \ Column Order | n1 | n2 | VDD | GND | ... | SCI_11 | | | |
|---|---|---|---|---|---|---|---|---|---|
| n1 | $Ge'_{11}{}^{[11]}$ | $Ge'_{11}{}^{[12]}$ | $Ge'_{11}{}^{[13]}$ | $Ge'_{11}{}^{[14]}$ | 0 | $Ve_{11}^{[1]}$ | × | $Ie'_{11}{}^{[1]}$ | = |
| n2 | $Ge'_{11}{}^{[21]}$ | $Ge'_{11}{}^{[22]}$ | $Ge'_{11}{}^{[23]}$ | $Ge'_{11}{}^{[24]}$ | 0 | $Ve_{11}^{[2]}$ | | $Ie'_{11}{}^{[2]}$ | |
| VDD | $Ge'_{11}{}^{[31]}$ | $Ge'_{11}{}^{[32]}$ | $Ge'_{11}{}^{[33]}$ | $Ge'_{11}{}^{[34]}$ | 0 | $Ve_{11}^{[3]}$ | | $Ie'_{11}{}^{[3]}$ | |
| GND | $Ge'_{11}{}^{[41]}$ | $Ge'_{11}{}^{[42]}$ | $Ge'_{11}{}^{[43]}$ | $Ge'_{11}{}^{[44]}$ | 0 | $Ve_{11}^{[4]}$ | | $Ie'_{11}{}^{[4]}$ | |
| ... | $Gie'_{11}{}^{[11]}$ | $Gie'_{11}{}^{[12]}$ | $Gie'_{11}{}^{[13]}$ | $Gie'_{11}{}^{[14]}$ | 1 | $Vi_{11}^{[1]}$ | | $Ii'_{11}{}^{[1]}$ | |

Figure 6C

Column Order

| Row Order | n2 | out | VDD | GND | ... | SCI_12 | | | |
|---|---|---|---|---|---|---|---|---|---|
| n2 | $Ge_{12}^{[11]}$ | $Ge_{12}^{[12]}$ | $Ge_{12}^{[13]}$ | $Ge_{12}^{[14]}$ | $Gei_{12}^{[11]}$ | | $Ve_{12}^{[1]}$ | | $Ie_{12}^{[1]}$ |
| out | $Ge_{12}^{[21]}$ | $Ge_{12}^{[22]}$ | $Ge_{12}^{[23]}$ | $Ge_{12}^{[24]}$ | $Gei_{12}^{[21]}$ | X | $Ve_{12}^{[2]}$ | = | $Ie_{12}^{[2]}$ |
| VDD | $Ge_{12}^{[31]}$ | $Ge_{12}^{[32]}$ | $Ge_{12}^{[33]}$ | $Ge_{12}^{[34]}$ | $Gei_{12}^{[31]}$ | | $Ve_{12}^{[3]}$ | | $Ie_{12}^{[3]}$ |
| GND | $Ge_{12}^{[41]}$ | $Ge_{12}^{[42]}$ | $Ge_{12}^{[43]}$ | $Ge_{12}^{[44]}$ | $Gei_{12}^{[41]}$ | | $Ve_{12}^{[4]}$ | | $Ie_{12}^{[4]}$ |
| ... | $Gie_{12}^{[11]}$ | $Gie_{12}^{[12]}$ | $Gie_{12}^{[13]}$ | $Gie_{12}^{[14]}$ | $Gi_{12}^{[11]}$ | | $Vi_{12}^{[1]}$ | | $Ii_{12}^{[1]}$ |

Figure 6D

Column Order

| Row Order | n2 | out | VDD | GND | ... | SCI_12 | | | |
|---|---|---|---|---|---|---|---|---|---|
| n2 | $Ge'_{12}^{[11]}$ | $Ge'_{12}^{[12]}$ | $Ge'_{12}^{[13]}$ | $Ge'_{12}^{[14]}$ | 0 | | $Ve_{12}^{[1]}$ | | $Ie'_{12}^{[1]}$ |
| out | $Ge'_{12}^{[21]}$ | $Ge'_{12}^{[22]}$ | $Ge'_{12}^{[23]}$ | $Ge'_{12}^{[24]}$ | 0 | X | $Ve_{12}^{[2]}$ | = | $Ie'_{12}^{[2]}$ |
| VDD | $Ge'_{12}^{[31]}$ | $Ge'_{12}^{[32]}$ | $Ge'_{12}^{[33]}$ | $Ge'_{12}^{[34]}$ | 0 | | $Ve_{12}^{[3]}$ | | $Ie'_{12}^{[3]}$ |
| GND | $Ge'_{12}^{[41]}$ | $Ge'_{12}^{[42]}$ | $Ge'_{12}^{[43]}$ | $Ge'_{12}^{[44]}$ | 0 | | $Ve_{12}^{[4]}$ | | $Ie'_{12}^{[4]}$ |
| ... | $Gie'_{12}^{[11]}$ | $Gie'_{12}^{[12]}$ | $Gie'_{12}^{[13]}$ | $Gie'_{12}^{[14]}$ | 1 | | $Vi_{12}^{[1]}$ | | $Ii'_{12}^{[1]}$ |

Figure 6E

Column Order 612

614 Row Order

|  | n1 | out | VDD | GND | n2 | | SCI_1 | | |
|---|---|---|---|---|---|---|---|---|---|
| n1 | $Ge_1^{[11]}$ | $Ge_1^{[12]}$ | $Ge_1^{[13]}$ | $Ge_1^{[14]}$ | $Gei_1^{[11]}$ | | $Ve_1^{[1]}$ | | $Ie_1^{[1]}$ |
| out | $Ge_1^{[21]}$ | $Ge_1^{[22]}$ | $Ge_1^{[23]}$ | $Ge_1^{[24]}$ | $Gei_1^{[21]}$ | $\times$ | $Ve_1^{[2]}$ | $=$ | $Ie_1^{[2]}$ |
| VDD | $Ge_1^{[31]}$ | $Ge_1^{[32]}$ | $Ge_1^{[33]}$ | $Ge_1^{[34]}$ | $Gei_1^{[31]}$ | | $Ve_1^{[3]}$ | | $Ie_1^{[3]}$ |
| GND | $Ge_1^{[41]}$ | $Ge_1^{[42]}$ | $Ge_1^{[43]}$ | $Ge_1^{[44]}$ | $Gei_1^{[41]}$ | | $Ve_1^{[4]}$ | | $Ie_1^{[4]}$ |
| n2 | $Gie_1^{[11]}$ | $Gie_1^{[12]}$ | $Gie_1^{[13]}$ | $Gie_1^{[14]}$ | $Gi_1^{[11]}$ | | $Vi_1^{[1]}$ | | $Ii_1^{[1]}$ |

Figure 6F

Column Order

Row Order

|  | n1 | out | VDD | GND | n2 | | SCI_1 | | |
|---|---|---|---|---|---|---|---|---|---|
| n1 | $\mathbf{Ge_1^{[11]}}$ | $Ge_1^{[12]}$ | $\mathbf{Ge_1^{[13]}}$ | $\mathbf{Ge_1^{[14]}}$ | $Gei_1^{[11]}$ | | $Ve_1^{[1]}$ | | $Ie_1^{[1]}$ |
| out | $Ge_1^{[21]}$ | $Ge_1^{[22]}$ | $Ge_1^{[23]}$ | $Ge_1^{[24]}$ | $Gei_1^{[21]}$ | $\times$ | $Ve_1^{[2]}$ | $=$ | $Ie_1^{[2]}$ |
| VDD | $Ge_1^{[31]}$ | $Ge_1^{[32]}$ | $Ge_1^{[33]}$ | $Ge_1^{[34]}$ | $Gei_1^{[31]}$ | | $Ve_1^{[3]}$ | | $Ie_1^{[3]}$ |
| GND | $Ge_1^{[41]}$ | $Ge_1^{[42]}$ | $Ge_1^{[43]}$ | $Ge_1^{[44]}$ | $Gei_1^{[41]}$ | | $Ve_1^{[4]}$ | | $Ie_1^{[4]}$ |
| n2 | $Gie_1^{[11]}$ | $Gie_1^{[12]}$ | $Gie_1^{[13]}$ | $Gie_1^{[14]}$ | $Gi_1^{[11]}$ | | $Vi_1^{[1]}$ | | $Ii_1^{[1]}$ |

Bold, to add SCI_11 $Ge'_{11}$ $Ie'_{11}$ of Figure 6B 652    654 / 656    658                                    660

Column Order

Row Order

|  | n1 | n2 | VDD | GND | ... | | SCI_11 | | |
|---|---|---|---|---|---|---|---|---|---|
| n1 | $Ge'_{11}^{[11]}$ | $Ge'_{11}^{[12]}$ | $Ge'_{11}^{[13]}$ | $Ge'_{11}^{[14]}$ | 0 | | $Ve_{11}^{[1]}$ | | $Ie'_{11}^{[1]}$ |
| n2 | $Ge'_{11}^{[21]}$ | $Ge'_{11}^{[22]}$ | $Ge'_{11}^{[23]}$ | $Ge'_{11}^{[24]}$ | 0 | | $Ve_{11}^{[2]}$ | | $Ie'_{11}^{[2]}$ |
| VDD | $Ge'_{11}^{[31]}$ | $Ge'_{11}^{[32]}$ | $Ge'_{11}^{[33]}$ | $Ge'_{11}^{[34]}$ | 0 | $\times$ | $Ve_{11}^{[3]}$ | $=$ | $Ie'_{11}^{[3]}$ |
| GND | $Ge'_{11}^{[41]}$ | $Ge'_{11}^{[42]}$ | $Ge'_{11}^{[43]}$ | $Ge'_{11}^{[44]}$ | 0 | | $Ve_{11}^{[4]}$ | | $Ie'_{11}^{[4]}$ |
| ... | $Gie'_{11}^{[11]}$ | $Gie'_{11}^{[12]}$ | $Gie'_{11}^{[13]}$ | $Gie'_{11}^{[14]}$ | 1 | | $Vi_{11}^{[1]}$ | | $Ii'_{11}^{[1]}$ |

Figure 6G

Column Order

| Row Order | n1 | out | VDD | GND | n2 | | SCI_1 | | |
|---|---|---|---|---|---|---|---|---|---|
| n1  | $Ge_1^{[11]}$ | $Ge_1^{[12]}$ | $Ge_1^{[13]}$ | $Ge_1^{[14]}$ | $Gei_1^{[11]}$ | | $Ve_1^{[1]}$ | | $Ie_1^{[1]}$ |
| out | $Ge_1^{[21]}$ | $Ge_1^{[22]}$ | $Ge_1^{[23]}$ | $Ge_1^{[24]}$ | $Gei_1^{[21]}$ | | $Ve_1^{[2]}$ | | $Ie_1^{[2]}$ |
| VDD | $Ge_1^{[31]}$ | $Ge_1^{[32]}$ | $Ge_1^{[33]}$ | $Ge_1^{[34]}$ | $Gei_1^{[31]}$ | X | $Ve_1^{[3]}$ | = | $Ie_1^{[3]}$ |
| GND | $Ge_1^{[41]}$ | $Ge_1^{[42]}$ | $Ge_1^{[43]}$ | $Ge_1^{[44]}$ | $Gei_1^{[41]}$ | | $Ve_1^{[4]}$ | | $Ie_1^{[4]}$ |
| n2  | $Gie_1^{[11]}$ | $Gie_1^{[12]}$ | $Gie_1^{[13]}$ | $Gie_1^{[14]}$ | $Gi_1^{[11]}$ | | $Vi_1^{[1]}$ | | $Ii_1^{[1]}$ |

Bold, to add SCI_12 $Ge'12$ $Ie'12$ of Figure 6D

Figure 6H

Column Order

| Row Order | n1 | out | VDD | GND | n2 | | SCI_1 | | |
|---|---|---|---|---|---|---|---|---|---|
| n1  | $Ge'_1^{[11]}$ | $Ge'_1^{[12]}$ | $Ge'_1^{[13]}$ | $Ge'_1^{[14]}$ | 0 | | $Ve_1^{[1]}$ | | $Ie'_1^{[1]}$ |
| out | $Ge'_1^{[21]}$ | $Ge'_1^{[22]}$ | $Ge'_1^{[23]}$ | $Ge'_1^{[24]}$ | 0 | | $Ve_1^{[2]}$ | | $Ie'_1^{[2]}$ |
| VDD | $Ge'_1^{[31]}$ | $Ge'_1^{[32]}$ | $Ge'_1^{[33]}$ | $Ge'_1^{[34]}$ | 0 | X | $Ve_1^{[3]}$ | = | $Ie'_1^{[3]}$ |
| GND | $Ge'_1^{[41]}$ | $Ge'_1^{[42]}$ | $Ge'_1^{[43]}$ | $Ge'_1^{[44]}$ | 0 | | $Ve_1^{[4]}$ | | $Ie'_1^{[4]}$ |
| n2  | $Gie_1^{[11]}$ | $Gie'_1^{[12]}$ | $Gie'_1^{[13]}$ | $Gie'_1^{[14]}$ | 1 | | $Vi_1^{[1]}$ | | $Ii'_1^{[1]}$ |

Figure 6I

Column Order: VDD, GND, ..., SCI_2
Row Order: VDD, GND, ...

$$\begin{bmatrix} Ge_2^{[11]} & Ge_2^{[12]} & Gei_2^{[11]} \\ Ge_2^{[21]} & Ge_2^{[22]} & Gei_2^{[21]} \\ Gie_2^{[11]} & Gie_2^{[12]} & Gi_2^{[11]} \end{bmatrix} \times \begin{bmatrix} Ve_2^{[1]} \\ Ve_2^{[2]} \\ Vi_2^{[1]} \end{bmatrix} = \begin{bmatrix} Ie_2^{[1]} \\ Ie_2^{[2]} \\ Ii_2^{[1]} \end{bmatrix}$$

Figure 6J

Column Order: VDD, GND, ..., SCI_2
Row Order: VDD, GND, ...

$$\begin{bmatrix} Ge'_2^{[11]} & Ge'_2^{[12]} & 0 \\ Ge'_2^{[21]} & Ge'_2^{[22]} & 0 \\ Gie'_2^{[11]} & Gie'_2^{[12]} & 1 \end{bmatrix} \times \begin{bmatrix} Ve_2^{[1]} \\ Ve_2^{[2]} \\ Vi_2^{[1]} \end{bmatrix} = \begin{bmatrix} Ie'_2^{[1]} \\ Ie'_2^{[2]} \\ Ii'_2^{[1]} \end{bmatrix}$$

Figure 6K

Column Order: in, n1, out, VDD, GND — Top circuit

Row Order: In, n1, out, VDD, GND $$\begin{pmatrix} G^{[11]} & G^{[12]} & G^{[13]} & G^{[14]} & G^{[15]} \\ G^{[21]} & G^{[22]} & G^{[23]} & G^{[24]} & G^{[25]} \\ G^{[31]} & G^{[32]} & G^{[33]} & G^{[34]} & G^{[35]} \\ G^{[41]} & G^{[42]} & G^{[43]} & G^{[44]} & G^{[45]} \\ G^{[51]} & G^{[52]} & G^{[53]} & G^{[54]} & G^{[55]} \end{pmatrix} \times \begin{pmatrix} V^{[1]} \\ V^{[2]} \\ V^{[3]} \\ V^{[4]} \\ V^{[5]} \end{pmatrix} = \begin{pmatrix} I^{[1]} \\ I^{[2]} \\ I^{[3]} \\ I^{[4]} \\ I^{[5]} \end{pmatrix}$$

Figure 6L

Column Order: in, n1, out, VDD, GND — Top circuit

Row Order: In, n1, out, VDD, GND $$\begin{pmatrix} \mathbf{G^{[11]}} & \mathbf{G^{[12]}} & G^{[13]} & G^{[14]} & G^{[15]} \\ \mathbf{G^{[21]}} & \mathbf{G^{[22]}} & G^{[23]} & G^{[24]} & G^{[25]} \\ G^{[31]} & G^{[32]} & G^{[33]} & G^{[34]} & G^{[35]} \\ G^{[41]} & G^{[42]} & G^{[43]} & G^{[44]} & G^{[45]} \\ G^{[51]} & G^{[52]} & G^{[53]} & G^{[54]} & G^{[55]} \end{pmatrix} \times \begin{pmatrix} V^{[1]} \\ V^{[2]} \\ V^{[3]} \\ V^{[4]} \\ V^{[5]} \end{pmatrix} = \begin{pmatrix} I^{[1]} \\ I^{[2]} \\ I^{[3]} \\ I^{[4]} \\ I^{[5]} \end{pmatrix}$$

Bold, to add r1

Figure 6M

Column Order: in, n1, out, VDD, GND — Top circuit

Row Order: In, n1, out, VDD, GND

$$\begin{pmatrix} G^{[11]} & G^{[12]} & G^{[13]} & G^{[14]} & G^{[15]} \\ G^{[21]} & \mathbf{G^{[22]}} & G^{[23]} & G^{[24]} & \mathbf{G^{[25]}} \\ G^{[31]} & G^{[32]} & G^{[33]} & G^{[34]} & G^{[35]} \\ G^{[41]} & G^{[42]} & G^{[43]} & G^{[44]} & G^{[45]} \\ G^{[51]} & \mathbf{G^{[52]}} & G^{[53]} & G^{[54]} & \mathbf{G^{[55]}} \end{pmatrix} \times \begin{pmatrix} V^{[1]} \\ V^{[2]} \\ V^{[3]} \\ V^{[4]} \\ V^{[5]} \end{pmatrix} = \begin{pmatrix} I^{[1]} \\ I^{[2]} \\ I^{[3]} \\ I^{[4]} \\ I^{[5]} \end{pmatrix}$$

Bold, to add c1

Figure 6N

|  | Column Order | | | | | | Top circuit | |
|---|---|---|---|---|---|---|---|---|
| Row Order | in | n1 | out | VDD | GND | | | |
| In | $G^{[11]}$ | $G^{[12]}$ | $G^{[13]}$ | $G^{[14]}$ | $G^{[15]}$ | | $V^{[1]}$ | $I^{[1]}$ |
| n1 | $G^{[21]}$ | $G^{[22]}$ | $G^{[23]}$ | $G^{[24]}$ | $G^{[25]}$ | | $V^{[2]}$ | $I^{[2]}$ |
| out | $G^{[31]}$ | $G^{[32]}$ | $G^{[33]}$ | $G^{[34]}$ | $G^{[35]}$ | X | $V^{[3]}$ = | $I^{[3]}$ |
| VDD | $G^{[41]}$ | $G^{[42]}$ | $G^{[43]}$ | $G^{[44]}$ | $G^{[45]}$ | | $V^{[4]}$ | $I^{[4]}$ |
| GND | $G^{[51]}$ | $G^{[52]}$ | $G^{[53]}$ | $G^{[54]}$ | $G^{[55]}$ | | $V^{[5]}$ | $I^{[5]}$ |

Bold, to add SCI_1 $Ge'1\ Ie'1$ of Figure 6H

Figure 6O

|  | Column Order | | | | | | Top circuit | |
|---|---|---|---|---|---|---|---|---|
| Row Order | in | n1 | out | VDD | GND | | | |
| In | $G^{[11]}$ | $G^{[12]}$ | $G^{[13]}$ | $G^{[14]}$ | $G^{[15]}$ | | $V^{[1]}$ | $I^{[1]}$ |
| n1 | $G^{[21]}$ | $G^{[22]}$ | $G^{[23]}$ | $G^{[24]}$ | $G^{[25]}$ | | $V^{[2]}$ | $I^{[2]}$ |
| out | $G^{[31]}$ | $G^{[32]}$ | $G^{[33]}$ | $G^{[34]}$ | $G^{[35]}$ | = | $V^{[3]}$ | $I^{[3]}$ |
| VDD | $G^{[41]}$ | $G^{[42]}$ | $G^{[43]}$ | $G^{[44]}$ | $G^{[45]}$ | | $V^{[4]}$ | $I^{[4]}$ |
| GND | $G^{[51]}$ | $G^{[52]}$ | $G^{[53]}$ | $G^{[54]}$ | $G^{[55]}$ | | $V^{[5]}$ | $I^{[5]}$ |

Bold, to add SCI_2 $Ge'2\ Ie'2$ of Figure 6J

METHOD AND SYSTEM FOR HIERARCHICAL CIRCUIT SIMULATION USING PARALLEL PROCESSING

CROSS REFERENCE TO RELATED APPLICATIONS

This application is a continuation-in-part application of U.S. patent application Ser. No. 16/428,703, filed May 31, 2019, which claims priority to U.S. Provisional Application Ser. No. 62/679,645, filed Jun. 1, 2018, entitled "Method and System for Hierarchical and Parallel Circuit Simulation," each of which is hereby incorporated by reference in its entirety.

FIELD OF THE INVENTION

The various embodiments described in this document relate in general to computer aided design of very large-scale integrated circuits, and more specifically to method and system for hierarchical circuit simulation using parallel processing.

BACKGROUND

The increasing density and complexity of integrated circuits place higher and higher demand on the speed and capacity of computer systems performing circuit simulations for computer aided circuit design. Conventional circuit simulators, such as SPICE (Simulation Program with Integrated Circuit Emphasis) or SPICE 2, have been employed as a computer-aided design tool to analyze electromagnetic propagation behavior on circuits. Although SPICE or SPICE 2 could be used to simulate a microelectronic circuit, including the logic devices and the interconnect paths, a complete simulation using SPICE or SPICE 2 has become extremely time consuming, and may exceed the storage and processing capabilities of the computer system used to run the simulation, as the sizes and complexities of microelectronic circuits continue to increase.

SUMMARY

In some embodiments, a method to simulate a circuit is performed using one or more computer systems. The method comprises determining a top circuit and a plurality of sub-circuit instances (SCIs) from a netlist of the circuit, the plurality of SCIs forming a hierarchy under the top circuit such that each sub-circuit instance (SCI) of the plurality of SCIs is a parent SCI of one or more SCIs lower in the hierarchy and/or a child SCI of either the top circuit or another SCI higher in the hierarchy, each of the plurality of SCIs having external ports, at least one of the plurality of SCIs including internal nets.

The method further comprises, during an iteration round of one or more iteration rounds, obtaining respective circuit equation parameters for each respective SCI of the plurality of SCIs and storing at least a first portion of the circuit equation parameters for the respective SCI in electronic memory, wherein circuit equation parameters for each respective parent SCI among the plurality of SCIs are obtained after circuit equation parameters for each respective child SCI of the respective parent SCI are obtained, and wherein some of the circuit equation parameters for the respective parent SCI are obtained using a second portion of the circuit equation parameters for the respective child SCI.

The method further comprises, during the iteration round, determining signal values in the top circuit, the signal values including signal values at external ports of the top circuit and signal values at external ports of one or more child SCIs of the top circuit, and determining respective signal values of each respective SCI of the plurality of SCIs in the hierarchy in a top-down process. In some embodiments, in the top-down process, for any specific child SCI having internal nets, signal values at internal nets of the specific child SCI are obtained using one or more signal values of a parent SCI of the specific child SCI and a first portion of the circuit equation parameters for the specific child SCI, the one or more signal values of the parent SCI of the specific child SCI corresponding to one or more signal values at external ports of the specific child SCI.

In some embodiments, obtaining respective circuit equation parameters for each respective SCI of the plurality of SCIs comprises identifying a set of SCIs having a common circuit topology, where circuit equation parameters for each child SCI of each of the set of SCIs have been obtained during the iteration round. In some embodiments, some circuit equation parameters for each particular SCI of the set of SCIs are obtained using circuit equation parameters for each child SCI of the particular SCI, and remaining circuit equation parameters of the particular SCI are obtained by executing a same set of computer program instructions to corresponding to the common circuit topology. The subset of the set of SCIs includes one, some, or all of the SCIs in the set of SCIs.

In some embodiments, executing a same set of computer program instructions to obtain remaining circuit equation parameters for each subset of the set of SCIs having the common circuit topology comprises executing a same set of computer program instructions once to obtain remaining circuit equation parameters for each of two or more SCIs of the set of SCIs in parallel.

In some embodiments, determining respective signal values of each respective SCI of the plurality of SCIs in the hierarchy comprises identifying a set of SCIs having a common circuit topology after signal values for a parent SCI of each of the set of SCIs having been obtained during the iteration round, and executing a same set of computer program instructions to compute signal values at internal nets of each SCI of the set of SCIs having the common circuit topology.

In some embodiments, executing a same set of computer program instructions to compute signal values at internal nets of each SCI of the set of SCIs having the common circuit topology comprises executing a same set of computer program instructions once to compute signal values at internal nets of each of two or more SCIs of the set of SCIs in parallel.

In some embodiments, obtaining respective circuit equation parameters for each respective SCI of the plurality of SCIs comprises obtaining first circuit equation parameters for a first SCI and obtaining second circuit equation parameters for a second SCI, the first circuit equation parameters having a first value precision and the second circuit equation parameters having a second value precision that is different from the first value precision.

In some embodiments, the first SCI is a child SCI of the second SCI, and obtaining the second circuit equation parameters for the second SCI comprises converting a second portion of the first circuit equation parameters for the first SCI from the first value precision to the second value precision before using the second portion of the first circuit equation parameters to obtain some of the second circuit equation parameters for the second SCI.

In some embodiments, signal values at internal nets of the first SCI are determined with a first value precision and signal values at internal nets of the second SCI are determined with a second value precision that is different from the first value precision. In some embodiments, determining respective signal values of each respective SCI of the plurality of SCIs in the hierarchy comprises converting and one or more signal values of the second SCI from the second value precision to the first value precision before using the one or more signals values of the second SCI to determine the signal values at the internal nets of the first SCI, the one or more signal values of the second SCI corresponding to one or more signal values at external ports of the first SCI.

In some embodiments, a system to simulate a circuit comprises processors. At least one processor among the processors is configured to determine a top circuit and a plurality of sub-circuit instances (SCIs) from a netlist of the circuit, the plurality of SCIs forming a hierarchy under the top circuit such that each sub-circuit instance (SCI) of the plurality of SCIs is a parent SCI of one or more SCIs lower in the hierarchy and/or a child SCI of either the top circuit or another SCI higher in the hierarchy, each of the plurality of SCIs having external ports, at least one of the plurality of SCIs including internal nets.

At least some of the processors is configured to obtain, during an iteration round of one or more iteration rounds, respective circuit equation parameters for each respective SCI of the plurality of SCIs in a bottom-up process, where circuit equation parameters for each respective parent SCI among the plurality of SCIs are obtained after circuit equation parameters for each respective child SCI of the respective parent SCI, and wherein at least some of the circuit equation parameters for the respective parent SCI are obtained using a second portion of the circuit equation parameters for the respective child SCI.

A first processor among the processors is configured to obtain, during the iteration round, first circuit equation parameters for a first SCI of the plurality of SCIs during the iteration round. A second processor among the processors is configured to obtain second circuit equation parameters for a second SCI of the plurality of SCIs during the iteration round, the second SCI being a parent SCI of the first SCI. The first processor is further configured to pass at least a second portion of the first circuit equation parameters to the second processor. The second processor is further configured to use the second portion of the first circuit equation parameters to obtain at least some of the second circuit equation parameters for the second SCI.

In some embodiments, at least one processor among the one or more processors is configured determine, during the iteration round, signal values in the top circuit, the signal values including signal values at external ports of the top circuit and signal values at external ports of one or more child SCIs of the top circuit. At least some of the processors is configured to determine, during the iteration round, respective signal values of each respective SCI of the plurality of SCIs in a top down process, where, for a specific child SCI having internal nets, signal values at internal nets of the specific child SCI are obtained using one or more signal values of a parent SCI of the specific child SCI and a first portion of the circuit equation parameters for the specific child SCI, the one or more signal values of the parent SCI of the specific child SCI corresponding to one or more signal values at external ports of the specific child SC.

A third processor is configured to determine, during the iteration round, first signal values of the first SCI. A fourth processor is configured to determine, during the iteration round, second signal values of the second SCI, and to pass at least one or more of the second signal values to the third processor, the one or more of the second signal values corresponding to one or more signal values at external ports of the first SC. The third processor is further configured to determine at least some of the first signal values of the first SCI using the one or more of the second signal values and a second portion of the first circuit equation parameters.

Thus, in the bottom-up process, intermediate results of lower-level calculations are incorporated into higher-level calculations until the circuit equation for the top circuit is generated. In the top-down process, signal values from higher-level calculations are used in the lower-level calculations until the signal values of all the leaf SCIs are determined. The calculations related to the individual SCIs can be distributed among multiple processors of one or more computers. The calculation of any SCI can be simplified/skipped when the signals of the SCI change slowly or remain constant between previous consecutive iteration rounds. The method according to some embodiments enables simulation of very large circuit hierarchically at the same SPICE accuracy using multiple processors/computers. The method also has capabilities to speed up like FAST-SPICE while maintaining SPICE accuracy.

BRIEF DESCRIPTION OF THE DRAWINGS

The present embodiments are illustrated by way of example and not limitation in the figures of the accompanying drawings, in which like references indicate similar elements, and in which:

FIGS. 3A to 3D are flowcharts illustrating a method 300 of simulating a hierarchical circuit according to some embodiments;

FIGS. 6A through 6O illustrate processed of obtaining submatrices and subvectors for each SCI in a hierarchical netlist, and constructing circuit equations for the top circuit, according to some embodiments;

DETAILED DESCRIPTION OF THE EMBODIMENTS

Figure 1A:
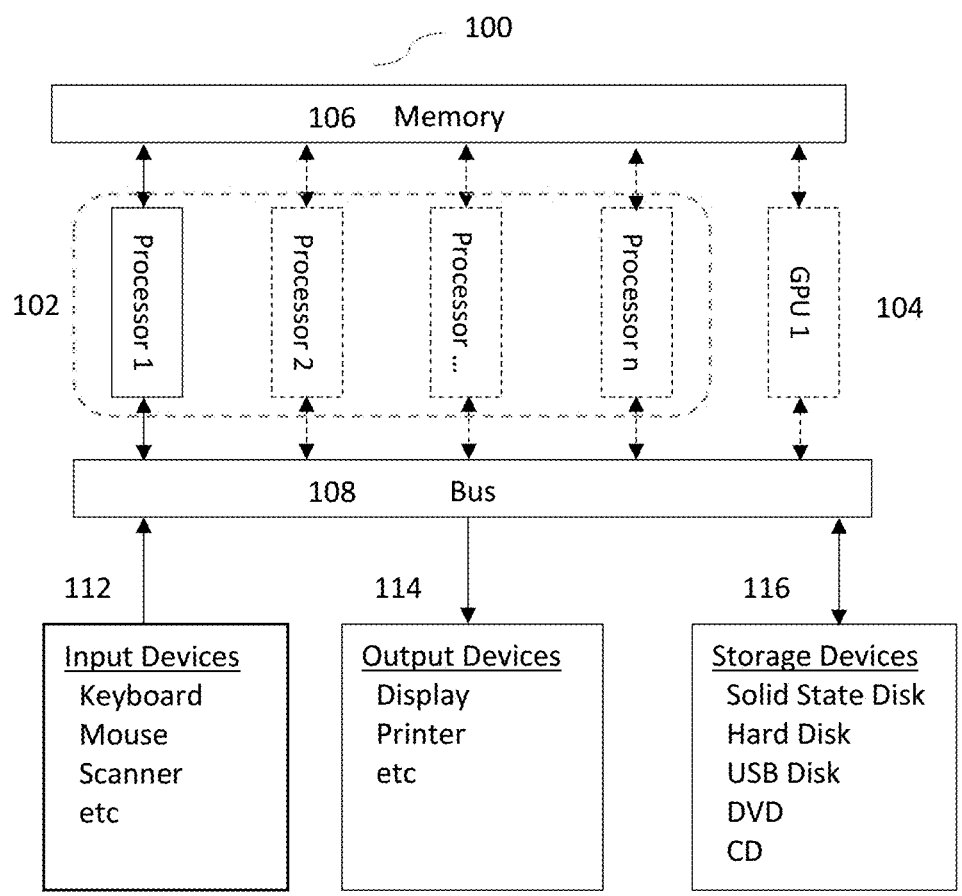
FIG. 1A is a block diagram of a computer system that can be configured to carry out, either individually or in conjunction with one or more other similarly configured computer systems, a method of simulating a hierarchical circuit according to some embodiments.

According to some embodiments, a method of simulating a circuit can be performed by one or more processors in one or more computer systems, each of the one or more computer systems including at least one processor. The one or more computer systems include or have access to one or more memory devices. FIG. 1A is a block diagram of a computer system 100 that can be configured to carry out, either individually or in conjunction with one or more other similarly configured computer systems, a method of simulating a circuit according to some embodiments. As shown in FIG. 1A, computer system 100 includes one or more processors 102 coupled to a bus 108, one or more optional graphic processing units (GPUs) 104 coupled to bus 108, memory 106 accessible by processors 102 and GPUs 104, and input devices 112, output devices 114, and storage device 116 coupled to bus 108. Input devices 112 may include, for example, keyboard, mouse, and scanner etc. Output devices 114 may include, for example, display and printer etc. Storage devices 116 may include, for example, solid state disks, hard disks, USB disks, DVD CD etc. In some embodiments, the method of simulating a circuit is carried out by one or more of the processors 102 executing computer program instructions stored in the memory 106.

Figure 1B:
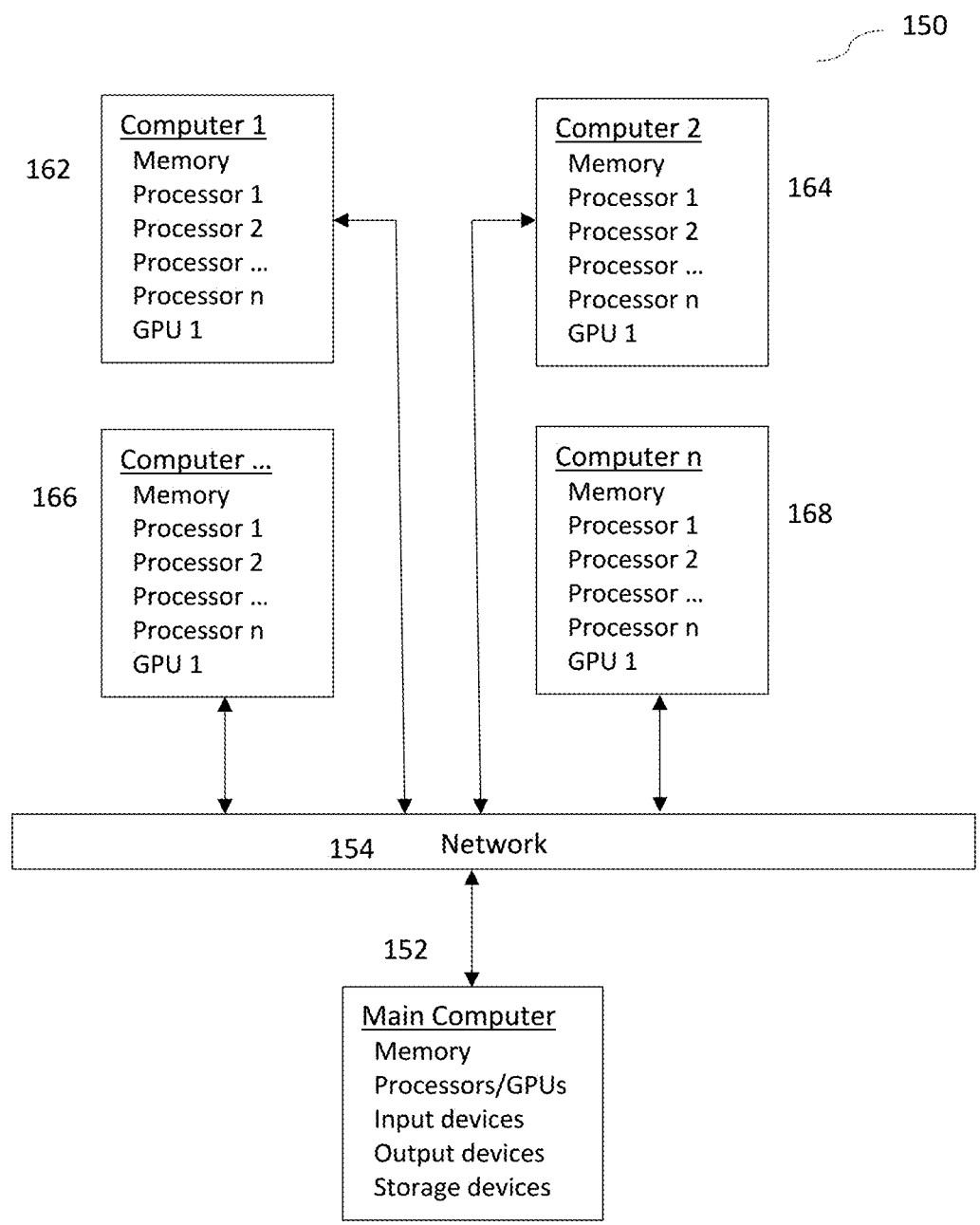
FIG. 1B is a block diagram illustrating multiple computer systems that can be used to jointly carry out a method of simulating a circuit according to some embodiments.

FIG. 1B is a block diagram illustrating a computer network 150 including multiple computer systems that can be used to jointly carry out a method of simulating a circuit according to some embodiments. In some embodiments, the multiple computer systems include a main computer system 152 and one or more other computer systems (e.g., computer systems 162, 164, 166, and/or 168), coupled with each other either directly or via a network 154. Network 154 can be a local area network (LAN) or wide area network (WAN). In some embodiments, computer system 100 can be used as each of computer systems 152, 162, 164, 166, and 168. A processor in main computer system 152 is configured to receive a circuit netlist representing a circuit to be simulated, to start the method of simulating the circuit and to manage the other processors and/or GPUs in computer system(s) 152, 162, 164, 166, and/or 168 to calculate output results. The memory or memories 106 of computer system(s) 152, 162, 164, 166 and/or 168 are configured to store the circuit netlist, intermediate results and final results. In some embodiments, network 154 is configured pass the intermediate results among the computer systems 152, 162, 164, 166 and/or 168.

In some embodiments, a processor in main computer system 152 is configured to retrieve from storage devices 116, the circuit netlist (or netlist), which is a textual representation of the circuit to be simulated. The processor may also receive the netlist from another computer system or storage device via network 154, or as user input via input devices 112. In some embodiments, the circuit includes interconnected circuit elements. The design of a modern day integrated circuit (e.g., very large scale integrated circuit or VLSI) relies heavily on its hierarchical architecture, in which the circuit is viewed as a collection of building blocks or modules that are further divided into submodules or subcircuits in a recursive and hierarchical manner. The use of a subcircuit at a given level of the hierarchy is called an instance. A subcircuit instance at a given level may include other subcircuit instance(s) at a lower level. In this case, the subcircuit instance at the given level is said to be the parent of the other subcircuit instance(s) at the lower level, the other subcircuit instance(s) at the lower level can be said to be the child subcircuit instance(s) of the subcircuit instance at the given level. A subcircuit instance with no child subcircuit is called a leaf subcircuit instance. At any level of the hierarchy, there may also be primitive circuit elements or devices such as resistors, capacitors, and transistors, which does not include any instances of other subcircuits. In general, a subcircuit instance (SCI) is represented by its external ports and not by its contents (e.g., circuit components). A circuit that has all its subcircuit instances recursively replaced with their respective contents would be reduced to a hierarchical depth of one and is said to be flattened, or fully instantiated.

Figures 2A, 2B:
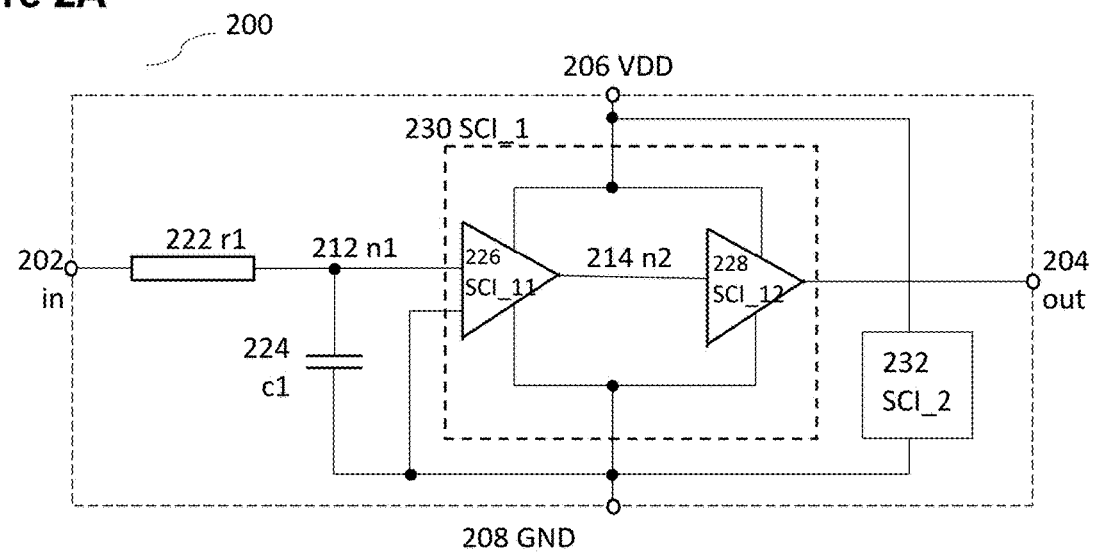
FIG. 2A illustrates a circuit 200 including primitive devices and subcircuit instances (SCIs), according to some embodiments.
FIG. 2B illustrates an example of a netlist for a circuit, according to some embodiments.

For example, FIG. 2A illustrates a circuit 200 including primitive devices and subcircuit instances (SCIs), according to some embodiments. As shown, circuit 200 includes a plurality of external ports (e.g., port "in" 202, port "out" 204, power terminal VDD 206, and ground terminal GND 208). Circuit 200 further includes subcircuit instances (e.g., SCI_1 230, SCI_2 232), primitive device (e.g., resistor r1 222 and capacitor r1 224), and internal nets (e.g., internal net "n1" 212 between subcircuit instance SCI_1 230 and resistor r1 222). Resistor r1 222 is coupled between port "in" 202 and internal net "n1" 212, and capacitor c1 224 is coupled between internal net "n1" 212 and ground terminal GND 208. SCI_1 230 has four external ports (e.g., port "n1" 212, port "out" 204, port VDD 206 and port GND 208). SCI_1 230 has two child SCIs (e.g., SCI_11 226 and SCI_12 228) and one internal net "n2" 214 between the two child SCIs. SCI_2 232 has two external ports (e.g., port VDD 206 and port GND 208) and no internal net. SCI_11 226 has external port "n1" 212, "n2" 214, VDD 206 and GND 208, and no internal net. SCI_12 228 has external ports "n2" 214, out 204, VDD 206 and GND 208, and no internal net. The external ports and internal nets of an SCI are also referred to as its nodes.

FIG. 2B illustrates an example of a netlist 201 for circuit 200, according to some embodiments. As shown, netlist 201 includes textual definition of circuit topology and element values in circuit 200. In netlist 201, each element in the circuit is specified by an element line including the element name (e.g., SCI_1), the connecting ports or nodes (e.g., n1 GND out VDD GND), and electrical parameter values if any.

Conventionally, a circuit hierarchy is typically flattened to the device level during circuit simulation. For example, circuit simulation programs such as SPICE would read a netlist of a circuit to be simulated and all of its input signals, and solve a set of mathematical equations involving all of the circuit components or elements in the flattened circuit to obtain the circuit response in the form of output signals. Because the circuit is flattened and fully instantiated, the device connectivity and device parameters for each of a large number (e.g., millions) of interconnected devices have to be stored during simulation. Such massive amount of memory usage makes it impractical to use existing circuit simulators to perform full-chip circuit simulation on today's VLSI circuits. Furthermore, solving the set of mathematical equations involving all of the circuit components or elements in the flattened circuit together makes it difficult, if not impossible, to use multiple processors or computers to speed up the calculation. Thus, conventional circuit programs fall short in both speed and capacity.

Figure 3A:
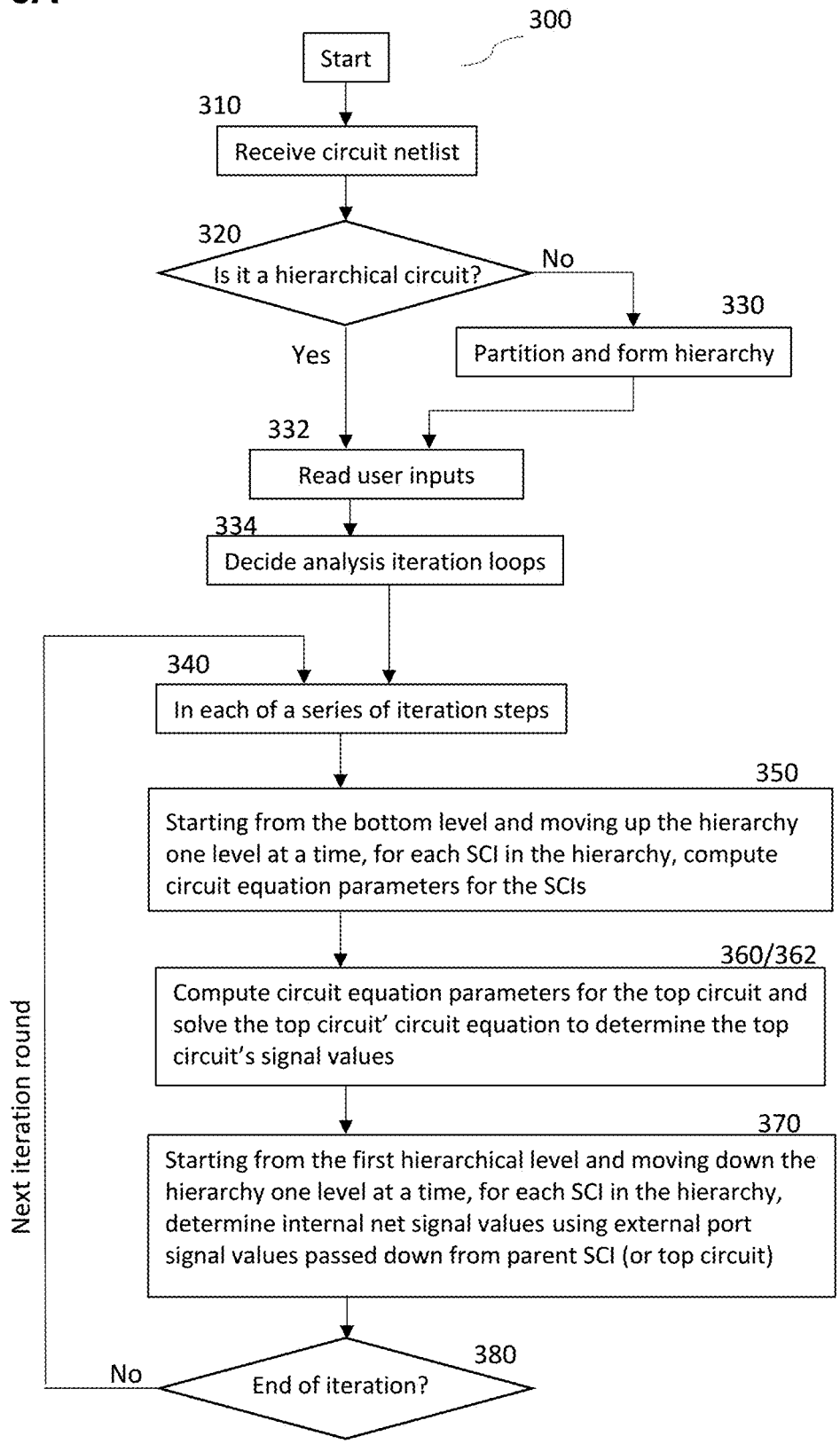

Systems and methods for simulating a circuit according to some embodiments overcome the problems of conventional circuit simulators by utilizing the hierarchical structure of the circuit. FIGS. 3A to 3D are flowcharts illustrating a method 300 of simulating a circuit (e.g., circuit 200) according to some embodiments. Method 300 can be performed by one or more processors in one or more computer systems (e.g., computer system(s) 100, 152, 162, 164, 166, and/or 168). As shown in FIG. 3A, method 300 includes receiving (310), by one or more processors of the one or more computer systems, a netlist of the circuit to be simulated, and determining (320) if the netlist describes a hierarchical circuit. Sometimes the netlist can be transferred from a conventional simulator and is flattened. In this case, method 300 further includes partitioning (330) the netlist into a hierarchical structure.

Figure 4:
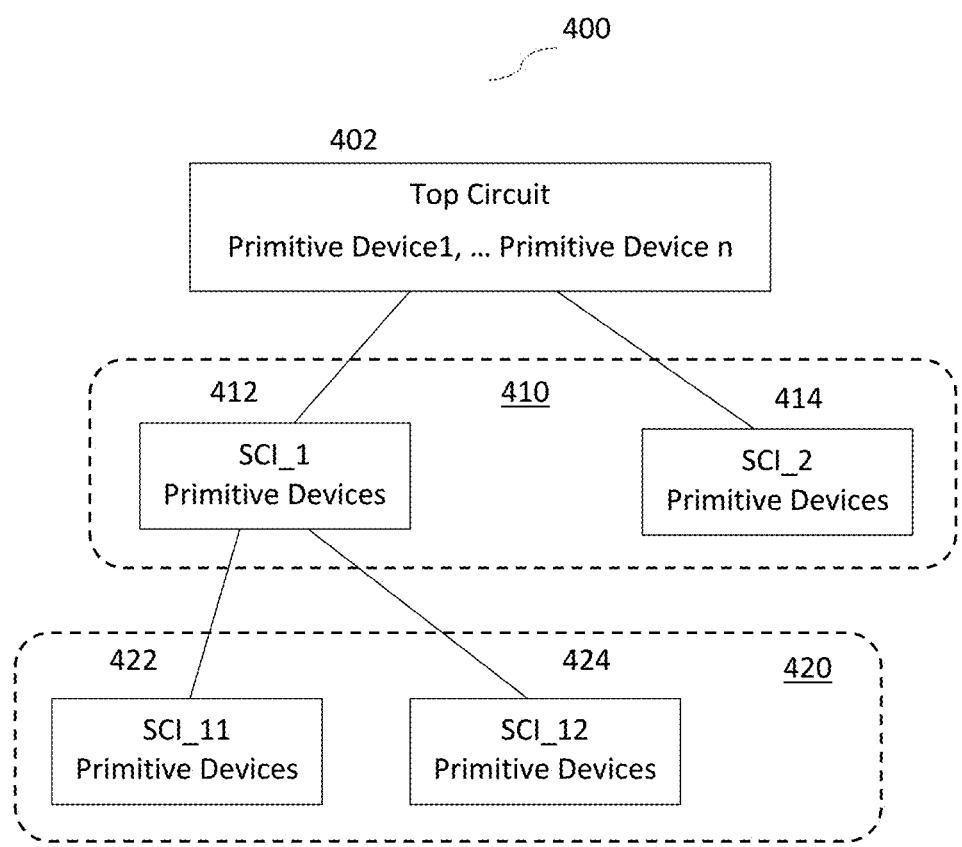
FIG. 4 illustrates a hierarchical netlist including a top circuit, primitive devices, and a plurality of sub-circuit instances, according to some embodiments.

For example, as shown in FIG. 4, a hierarchical netlist 400 for circuit 200 includes a top circuit 402, which includes primitive devices such as r1 and c1, and a plurality of sub-circuit instances (SCIs) (e.g., SCI_1 412 corresponding to SCI_1 230, SCI_2 414 corresponding to SCI_1 232, SCI_11 422 corresponding to SCI_1 226, and SCI_12 424 corresponding to SCI_1 228) forming at least three hierarchical levels, including a first level 410 under the top circuit 402 and a second level 420 under first level 410, which happens to be at the bottom level for one of the branches under the top circuit 402. First level 410 includes subcircuit instance SCI_1 412, and subcircuit instance SCI_2 414, which happens to be at the bottom level of another branch under the top circuit 402. Second level 420 includes subcircuit instances SCI_11 422, and SCI_12 424. Each sub-circuit instance (SCI) of the plurality of SCIs is a child of another SCI at a higher level or a child of the top circuit. Each sub-circuit instance (SCI) of the plurality of SCIs is a parent of one or more other SCIs at a lower level or it is a leaf SCI with no child SCI. Thus, each level of the hierarchy includes at least one SCI. In some embodiments, each of the plurality of SCIs (e.g., SCI_1 412) has external ports (e.g., port "n1" and output port 204), and at least one of the plurality of SCIs (e.g., SCI_1 230) includes one or more internal nets (e.g., node "n2"). In some embodiments, an external port of a child SCI could be an external port or internal net of the parent SCI, while any internal net of the child SCI is not an internal net of the parent SCI. In this example, top circuit 402 is at the top of the hierarchy and has child SCI_1 412 and SCI_2 414. SCI_1 412 has child SCI_11 422 and SCI_12 424. Also, SCI_2 414, SCI_11 422 and SCI_12 424 are leaf SCIs in the hierarchy and have no child SCIs. Each of the top circuit 402 and the SCIs 412, 414, 422, and 424 may also include primitive devices such as resistors, capacitors, inductors, mutual inductors, transmission lines, diodes, bipolar junction transistors (BJT), junction field effect transistors (JFET), metal-oxide-semiconductor field effect transistors (MOSFET), metal-semiconductor field effect transistors (MESFET), thin-film transistors (TFT), etc.

Figure 5A:
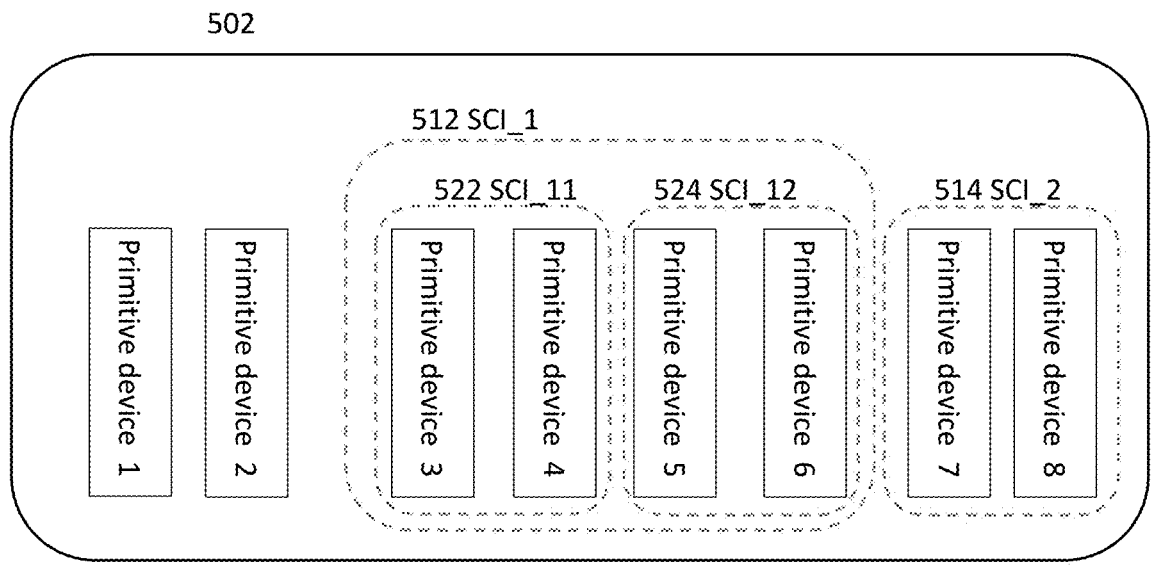
FIG. 5A illustrates a flattened circuit as an example.
Figure 5B:
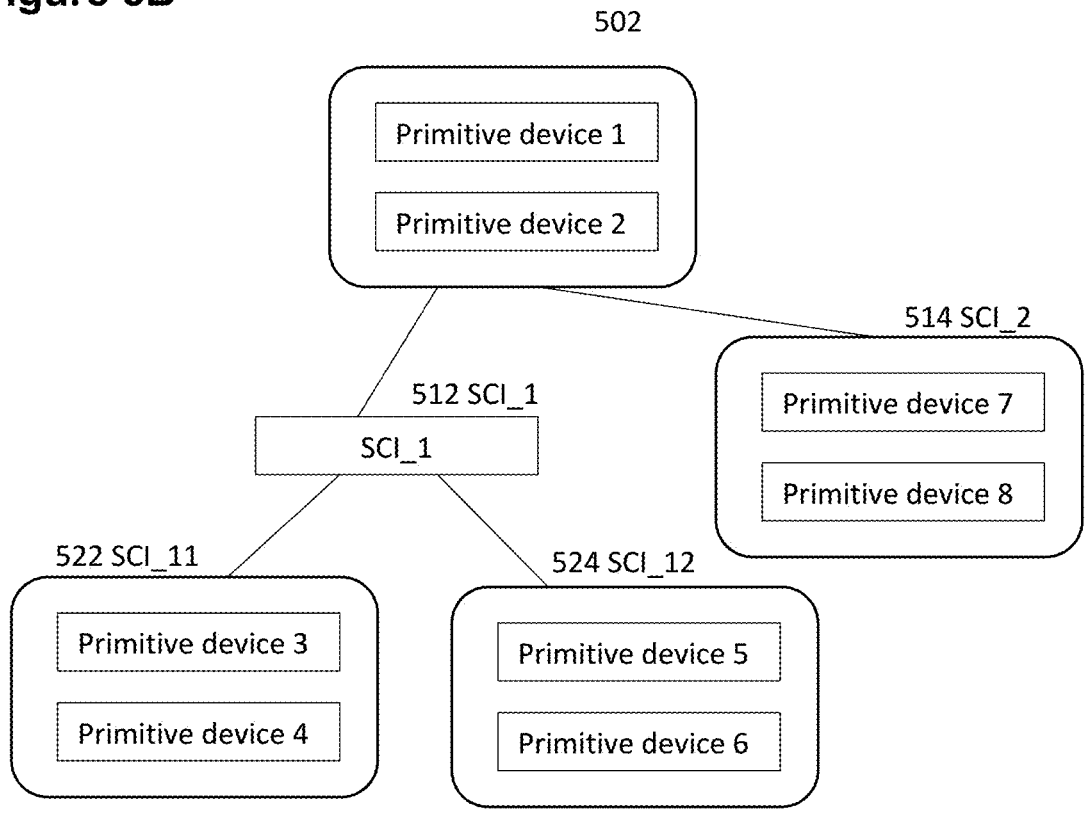
FIG. 5B illustrates a hierarchical circuit as an example.

In some embodiment, if the received circuit is a flat circuit netlist which has primitive devices but no SCIs and no hierarchical structure, method 300 would include partitioning (330) the flat circuit netlist to form a hierarchical netlist. In some embodiments, partitioning (330) the flat circuit may include grouping the primitive devices to different groups, add one or more SCIs to each group by moving primitive devices to the corresponding SCIs. For example, as shown in FIG. 5A, a circuit 502 when flattened is shown to include primitive device 1~8, all in one level. During partitioning, primitive device 3~4 are place in group 522 as SCI_11, primitive device 5~6 are place in group 524 as SCI_12, primitive device 7~8 are place in group 514 as SCI_2. SCI_11 and SCI_12 are grouped together in group 512 as SCI_1. Thus, after partitioning, circuit 502 has a hierarchical structure similar to that shown in FIG. 4, as illustrated in FIG. 5B.

In some embodiments, for efficiency purpose, partitioning (330) the flat circuit netlist to form a hierarchical netlist may further include adjusting the hierarchical structure by (1) collapsing part of the hierarchical structure (e.g., absorbing SCI_11 and SCI_12 into SCI_1), and (2) expanding the hierarchical structure by partitioning some of the SCIs into multiple SCIs in multiple levels.

In some embodiments, one or more processors in one or more computer systems receive respective portions of the circuit netlist. Each processor of the one or more processors may be assigned to perform a respective part of the simulation process and may read the entire circuit netlist or a respective portion of the circuit netlist that is required to perform the calculation assigned to the processor. The one or more processors may read the entire circuit netlist or respective portions of the circuit netlist in parallel and performed their respective parts of the simulation process in parallel.

Figure 2C:
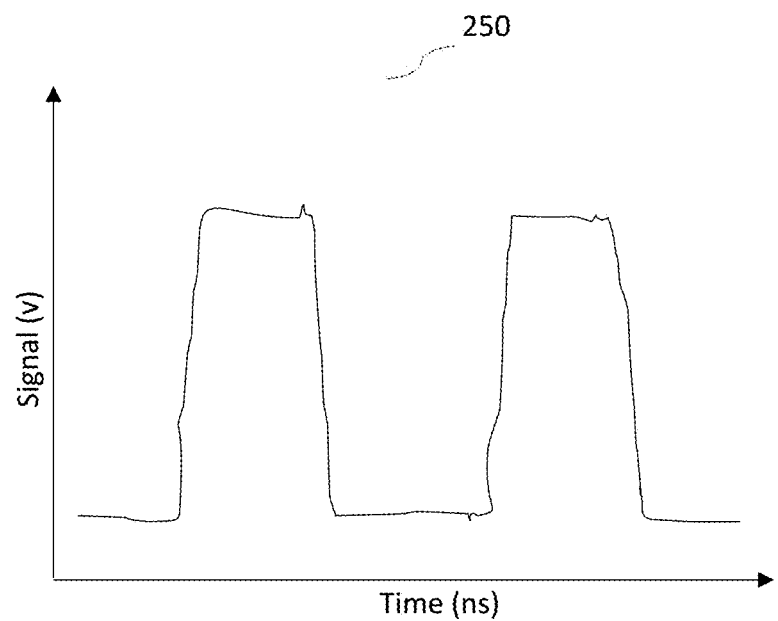
FIG. 2C illustrates an example of a wave form of an input signal changing with time according to some embodiments.
Figure 2D:
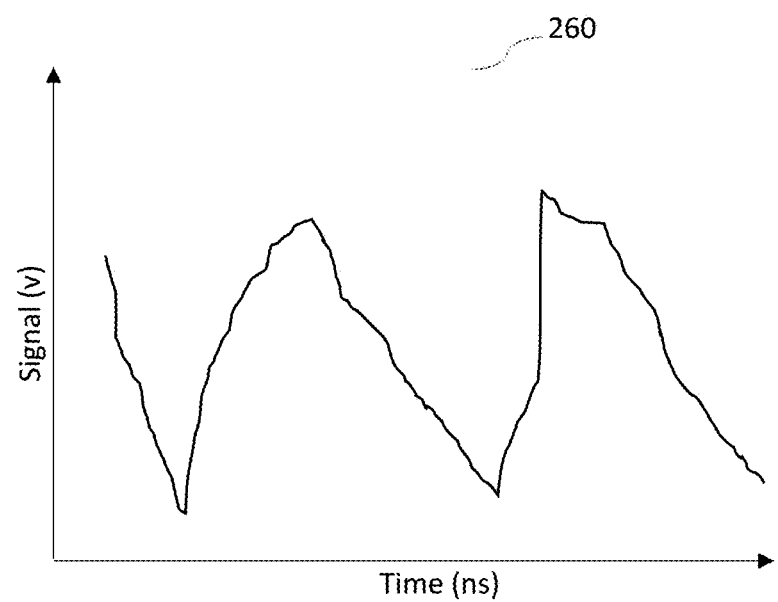
FIG. 2D illustrates an example of a simulated output signal changing with time according to some embodiments.

Referring to FIG. 3A, method 300 further includes reading (332) user inputs. In some embodiments, the user inputs may be provided from a user of the one or more computer systems as a wave form of an input signal at an external port (e.g., port "in") of the top circuit (e.g., circuit 200). FIG. 2C illustrates an example of a wave form of input signal changing with time according to some embodiments. Method 300 further includes determining (334) a series of iteration rounds (or steps) each corresponding to an input signal value of a set of input signal values at different points in time. As shown in FIG. 3A, in some embodiments, method 300 then iterates (340) through the series of iteration rounds to calculate a response output signal value at another external port (e.g., port "out") corresponding to each of the set of input signal values. FIG. 2D illustrates an example of an output signal changing with time, as simulation results output by the one or more computer system performing method 300.

Figure 3C:
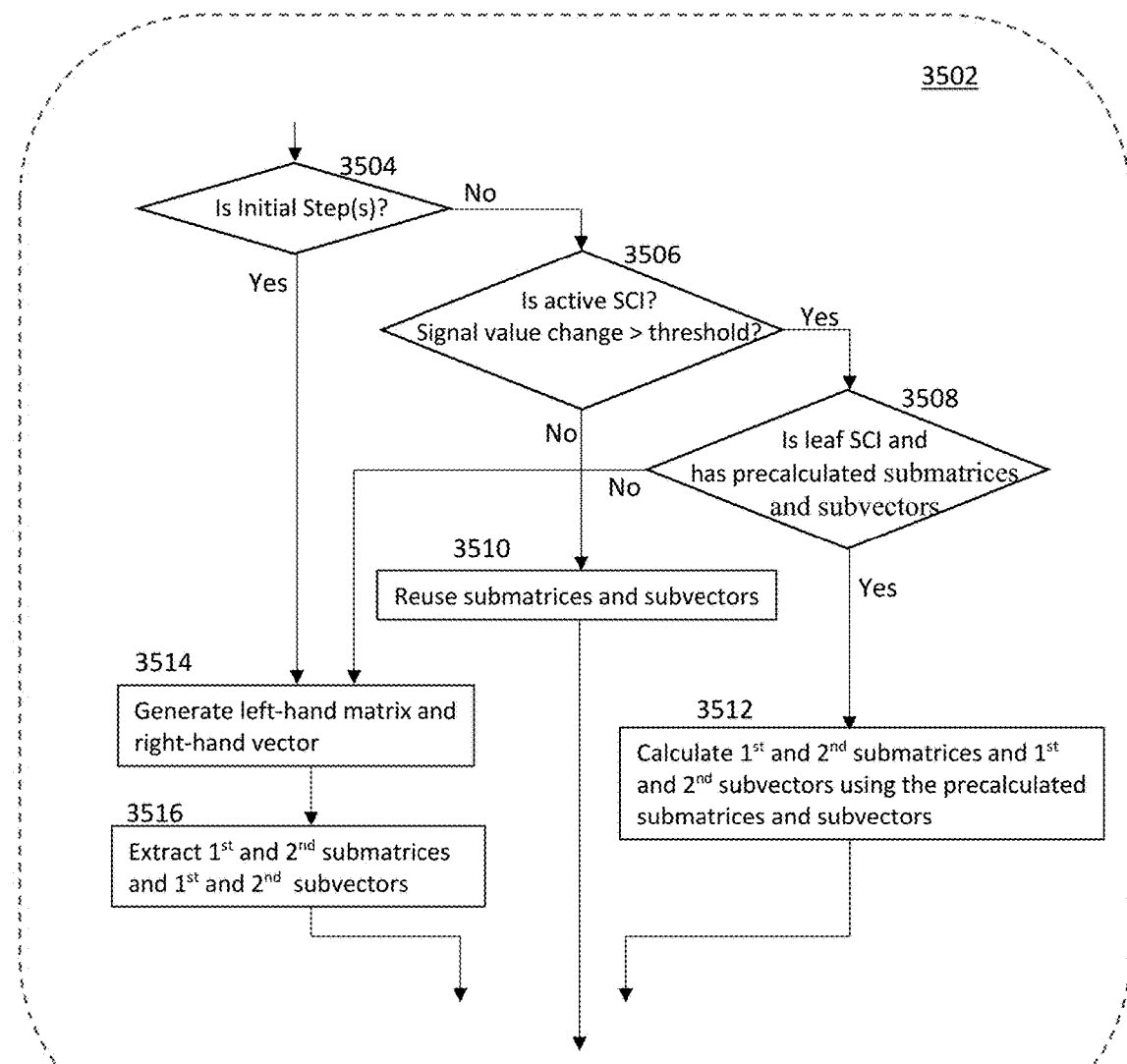

Referring to FIG. 3A, method 300 includes, in each iteration round of the series of iteration rounds, a bottom-up process (350) that starts from the bottom level of each of one or more branches and moves up the hierarchy level by level to obtain (3502), for each level in the hierarchy and for each SCI in the level, first and second submatrices and first and second subvectors of the SCI. As shown in FIG. 3C, according to some embodiments, at each respective level of the hierarchy and for each respective SCI at the respective level, obtaining (3502) first and second submatrices and first and second subvectors of the SCI includes determining (3504) if the current iteration round is an initial iteration round (e.g., one of the first one or more iteration rounds in the series of iteration rounds). In response to the determination that the current iteration round is an initial iteration round, process 350 proceeds to generate (3514) a circuit equation representing electrical characteristics and behaviors of the each respective SCI in the form of, for example, a matrix equation, such as equation (1) below:

$$G \cdot V = I \quad (1)$$

where G is a left-hand matrix of the SCI, V is a signal vector of the SCI, and I is a right-hand vector of the respective SCI. In its expanded form, equation (1) becomes the following for an SCI with n nodes:

$$\begin{bmatrix} G^{11} & \cdots & G^{1n} \\ \vdots & \ddots & \vdots \\ G^{n1} & \cdots & G^{nn} \end{bmatrix} \begin{bmatrix} V^1 \\ \vdots \\ V^n \end{bmatrix} = \begin{bmatrix} I^1 \\ \vdots \\ I^n \end{bmatrix} \quad (1a)$$

where $G_{ij}$ represents a left-hand matrix element corresponding to node i and node j (i=1, ..., n, j=1, ..., n), $I_i$ represents a right-hand vector element corresponding to node i, $V_i$ represents a signal value at node i. $G_{ij}$ and $I_i$ can be determined using, for example, standard SPICE method known to those skilled in the art. $V_i$ is a signal value to be calculated using the method 300. In some embodiments, the matrix equation is arranged such that nodes 1 through k are external ports (k=2, ..., n), and nodes k+1 through n are internal nets. In other words, the external ports and internal nets are organized separately in the matrix equation (1) or (1a). By organizing external ports and internal nets separately, the equation (1) can be expressed using submatrices Ge, Gie, Gei, G and subvectors Ve, Vi, Ie, Ii, as follows:

$$\begin{bmatrix} Ge & Gei \\ Gie & Gi \end{bmatrix} \times \begin{bmatrix} Ve \\ Vi \end{bmatrix} = \begin{bmatrix} Ie \\ Ii \end{bmatrix} \quad (2)$$

where $$Ge = \begin{bmatrix} G^{11} & \cdots & G^{1k} \\ \vdots & \ddots & \vdots \\ G^{k1} & \cdots & G^{kn} \end{bmatrix} \quad (2a)$$

$$Gie = \begin{bmatrix} G^{(k+1)1} & \cdots & G^{(k+1)k} \\ \vdots & \ddots & \vdots \\ G^{n1} & \cdots & G^{nk} \end{bmatrix} \quad (2b)$$

$$Gei = \begin{bmatrix} G^{1(k+1)} & \cdots & G^{1n} \\ \vdots & \ddots & \vdots \\ G^{k(k+1)} & \cdots & G^{kn} \end{bmatrix} \quad (2c)$$

$$Gi = \begin{bmatrix} G^{(k+1)(k+1)} & \cdots & G^{(k+1)n} \\ \vdots & \ddots & \vdots \\ G^{n(k+1)} & \cdots & G^{nn} \end{bmatrix} \quad (2d)$$

$$Ve = \begin{bmatrix} Ve^1 \\ \vdots \\ Ve^k \end{bmatrix} \quad (2e)$$

$$Vi = \begin{bmatrix} Vi^{k+1} \\ \vdots \\ Vi^n \end{bmatrix} \quad (2f)$$

$$Ie = \begin{bmatrix} Ie^1 \\ \vdots \\ Ie^k \end{bmatrix} \quad (2g)$$

$$Ii = \begin{bmatrix} Ii^{k+1} \\ \vdots \\ Ii^n \end{bmatrix} \quad (2h)$$

As shown in FIG. 3B, obtaining (3502) first and second submatrices and first and second subvectors of the SCI further includes extracting (3516) first and second submatrices from the left-hand matrix and first and second subvectors from the right-hand vector. The first and second subvectors correspond to respective ones of the first and second submatrices. In some embodiments, extracting (3516) the submatrices and subvectors includes performing Gaussian elimination on equation (2) to transform the left-hand matrix and the right-hand vector. As a result, equation (2) becomes equation (3), as follows:

$$\begin{bmatrix} Ge' & Gei' \\ Gie' & Gi' \end{bmatrix} \times \begin{bmatrix} Ve \\ Vi \end{bmatrix} = \begin{bmatrix} Ie' \\ Ii' \end{bmatrix} \quad (3)$$

where $$Ge' = \begin{bmatrix} Ge'^{11} & \cdots & Ge'^{1k} \\ \vdots & \ddots & \vdots \\ Ge'^{k1} & \cdots & Ge'^{kn} \end{bmatrix} \quad (3a)$$

$$Gie' = \begin{bmatrix} Gie'^{(k+1)1} & \cdots & Gie'^{(k+1)k} \\ \vdots & \ddots & \vdots \\ Gie'^{n1} & \cdots & Gie'^{nk} \end{bmatrix} \quad (3b)$$

$$Gei' = \begin{bmatrix} 0 & \cdots & 0 \\ \vdots & \ddots & \vdots \\ 0 & \cdots & 0 \end{bmatrix} \quad (3c)$$

$$Gi' = \begin{bmatrix} 1 & \cdots & 0 \\ \vdots & \ddots & \vdots \\ 0 & \cdots & 1 \end{bmatrix} \quad (3d)$$

where Gie' and Ge' are the extracted first and second submatrices, respectively, of the SCI, and Ii' and Ie' are the extracted first and second subvectors, respectively, of the SCI. Submatrix Gei' is now a [0] matrix, submatrix Gi' is now a unit matrix. Equation (3) can also be written as:

$$\begin{bmatrix} Ge' & \begin{bmatrix} 0 & \cdots & 0 \\ \vdots & \ddots & \vdots \\ 0 & \cdots & 0 \end{bmatrix} \\ Gie' & \begin{bmatrix} 1 & \cdots & 0 \\ \cdots & 1 & \cdots \\ 0 & \cdots & 1 \end{bmatrix} \end{bmatrix} \times \begin{bmatrix} Ve \\ Vi \end{bmatrix} = \begin{bmatrix} Ie' \\ Ii' \end{bmatrix} \quad (3e)$$

which can be broken into two sub-equations:

$$[Vi]=[Ii']-[Gie']\times[Ve] \quad (4a)$$

$$[Ge']\times[Ve]=[Ie'] \quad (4b)$$

From sub-equation (4a), internal signal value [Vi] can be calculated by external port signal values [Ve], first submatrix [Gie'] and first subvector [Ii']. In sub-equation (4b), second submatrix Ge' is representative characteristic matrix corresponding to the external ports, the second subvector Ie' is right hand vector corresponding to the external ports, vector Ve includes external port values, which are unknown at this point.

In some embodiments, using Gaussian elimination to transform equation (2) into equation (3) can be done by lower-upper (LU) decomposition or factorization of submatrix Gi, with proper row and/or column orderings or permutations, into two factors—a lower triangular matrix Li and an upper triangular matrix Ui, e.g., $$Gi = Li*Ui \quad (5a)$$

or $$\begin{bmatrix} Ge & Gei \\ Gie & Li \times Ui \end{bmatrix} \times \begin{bmatrix} Ve \\ Vi \end{bmatrix} = \begin{bmatrix} Ie \\ Ii \end{bmatrix} \quad (5b)$$

Thus, by performing Gaussian elimination on equation (5b), [Ge], [Gie] and [Gei] are eliminated along with column/row of Li and Ui, and Gei' becomes [0].

In some embodiments, as shown in FIG. 3C, in response to the determination that the current iteration round is not one of the initial iteration round(s), obtaining (3502) first and second submatrices and first and second subvectors of the SCI would include determining (3506) if the respective SCI is an active SCI. In some embodiments, an SCI is an active SCI if any of its signal values has changed more than a preset threshold during previous iteration rounds e.g., the difference in the values of a particular signal (e.g., $Ve_j$, i=1, . . . , n) determined in two consecutive iteration rounds immediately prior to the current iteration round is greater than the preset threshold for the particular signal. In response to the determination that the respective SCI is not an active SCI, obtaining (3502) first and second submatrices and first and second subvectors of the SCI could include retrieving and reusing (3510), in the current iteration round, the submatrices and subvectors obtained in the previous iteration round, and steps 3514, 3516, and 3518 for this SCI at the current iteration round can be skipped. In response to the determination that the respective SCI is an active SCI, obtaining (3502) first and second submatrices and first and second subvectors of the SCI would include determining whether the respective SCI is a leaf SCI and has precalculated submatrix and subvectors templates.

In response to the determination that the each respective SCI is a leaf SCI and has precalculated submatrix and subvector templates, obtaining (3502) first and second submatrices and first and second subvectors of the SCI would include calculating (3512) the first and second submatrices and the first and second subvectors for the leaf SCI from the precalculated submatrix and subvectors templates. In response to the determination that the each respective SCI is not a leaf SCI or does not have precalculated submatrix and subvector templates, the matrix equation representing electrical characteristics of the each respective SCI is generated (3514), and first and second submatrices are extracted (3516) from the left-hand matrix and first and second subvectors are extracted (3516) from the right-hand vector, as discussed above. Thus, for each SCI in the netlist, the left-hand matrix and right-and vector of the SCI are generated during the initial iteration rounds and when the SCI is an active SCI and is not a leaf SCI with precalculated submatrix and subvector templates.

In some embodiments, the first submatrix and the first subvector obtained in step 3502 are stored in the one or more memory devices (e.g., memory 106), while the second submatrix and the second subvector obtained in step 3502 are incorporated into the matrix equation for the parent SCI of the current SCI. Thus, as shown in FIG. 3B, process 350 further includes saving (3518) at least the first submatrix and the first subvector into memory (e.g., memory 106) and/or storage (e.g., storage 116). In some embodiments, the second submatrix and the second subvector of the current SCI are passed (3520) to the processor assigned to calculate the matrix equation for the parent SCI at the next hierarchical level. In some embodiment, the second submatrix and the second subvector of the respective SCI are cached by a respective processor performing calculations on the respective SCI if the respective processor is also designated to perform calculation on the parent SCI. Or, if another processor in the same or different computer system has been designated to perform calculation on the parent SCI, access to the memory space holding the second submatrix and the second subvector of the current SCI is provided by the respective processor to the other processor via bus 108 or network 154. In either case, the second submatrix and the second subvector of the current SCI is passed (3520) to and incorporated into the matrix equation of the parent SCI in the same iteration round.

Referring to FIG. 3B, after the submatrices and subvectors for the respective SCI have been extracted and saved and/or passed to the next level of calculation, process 350 proceeds to determine (3522) whether each SCI at the current hierarchical level has had its submatrices and subvectors extracted, and if so, to determine (3523) if the next hierarchical level above is the top level in the hierarchy. If there are more SCI(s) in the current level to be worked on, or the next hierarchical level above is not the top level in the hierarchy, process 350 returns to step 3502 to perform calculation on the next SCI at the same level or at the next level above. Process 350 completes after the submatrices and subvectors for each SCI in the netlist are obtained for the current iteration round.

As discussed above, generating (3514) a matrix equation representing electrical characteristics and behaviors of a parent SCI would include incorporating the second submatrix and the second subvector of each of its child SCI(s). Since process 350 starts from the bottom hierarchical level and moves upwards one level at a time, the second submatrix and the second subvector of each of the child SCI(s) should have already been extracted before process 350 starts to generate the matrix equation (e.g., equation (1)) for the parent SCI.

Figure 7A:
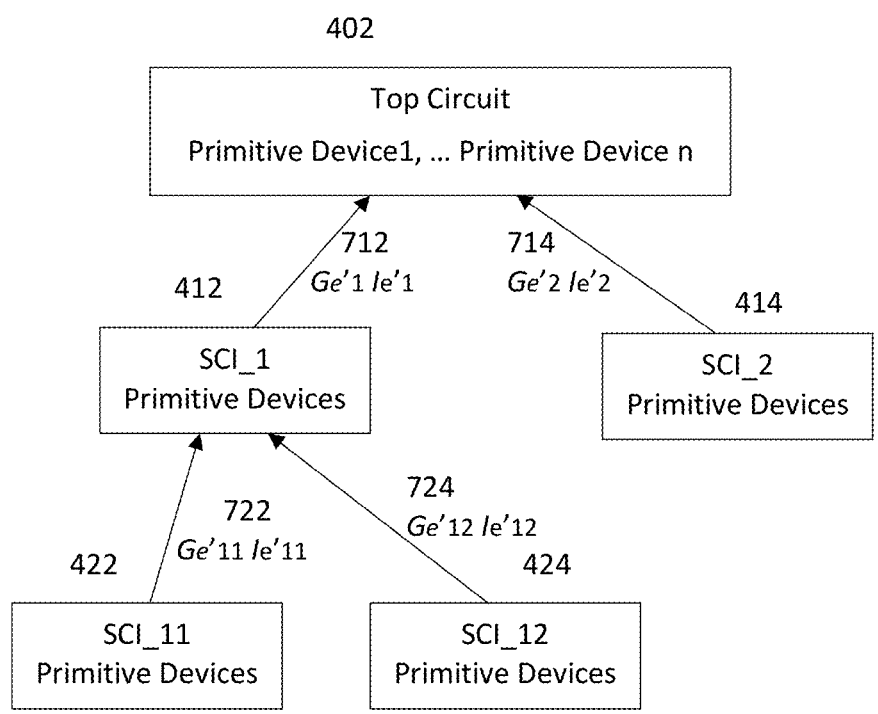
FIG. 7A illustrates a bottom-up process, according to some embodiments.

As example, FIGS. 6A through 6O illustrate how the submatrices and subvectors are obtained for each SCI in hierarchical netlist 400 (shown in FIG. 4). Starting at a leaf SCI (e.g., SCI_11 422) at the lowest hierarchical level (i.e., bottom level 420), FIG. 6A shows the matrix equation for the SCI_11, including a left-hand matrix $[G_{11}]$ and a right-hand vector $[I_{11}]$ of SCI_11. SCI_11 has external ports "n1" 212, "n2" 214, VDD 206, GND 208 and internal nets represented by " . . . " The equation representation of SCI_11 can be organized as shown in FIG. 6A, although the columns and rows orders can be different. Since this is a leaf SCI, the elements in the left-hand matrix $[G_{11}]$ can be calculated either from existing templates or from standard SPICE circuit analysis. FIG. 6B shows the transformed matrix equation for the SCI_11 after Gaussian elimination, with extracted first and second submatrices $[Gie'_{11}]$ and $[Ge'_{11}]$, and first and second subvectors $[Ii'_{11}]$ and $[Ie'_{11}]$. Since there is another SCI (e.g., SCI_12) at this level, process 350 proceeds to calculate the submatrices and subvectors for SCI_12. FIG. 6C shows the matrix equation for the SCI_12, including a left-hand matrix $[G_{12}]$ and a right-hand vector $[I_{12}]$ of SCI_12. SCI_12 has external ports "n2" 214, out, VDD 206, GND 208 and internal nets represented by " . . . " The equation representation of SCI_12 can be organized as shown in FIG. 6C, although the columns and rows orders can be different. FIG. 6D shows the transformed matrix equation for the SCI_12 after Gaussian elimination, with extracted first and second submatrices $[Gie'_{12}]$ and $[Ge'_{12}]$, and first and second subvectors $[Ie'_{12}]$ and $[Ii'_{12}]$. In some embodiments, the second submatrix $[Ge'_{11}]$ and second subvector $[Ie'_{11}]$ of SCI_11, and the second submatrix $[Ge'_{12}]$ and second subvector $[Ie'_{12}]$ of SCI_12, are passed up the hierarchical level and used to generate the left-hand matrix and right-hand vector of SCI_1, as shown in FIG. 7A.

After each SCI at the bottom level 420 has been calculated, process 350 continues to the next SCI (e.g., SCI_1) at the next level, which in this example is the first level 410 under the top circuit 402. SCI_1 has external ports "n1" 212, out 204, VDD 206, GND 208 and internal net "n2" 214, and the equation representation of SCI_1, with its the left-hand matrix $[G_1]$ and right-hand vector $[I_1]$, can be ordered as shown in FIG. 6E. Since this SCI_1 has child SCI's, according to some embodiments, the elements of the left-hand matrix $[G_1]$ and right-hand vector $[I_1]$ of SCI_1 are generated by incorporating the corresponding elements in the second submatrix and second subvector of each of its child SCI(s).

For example, as shown in FIG. 6F, SCI_11's second submatrix $Ge'_{11}$ is incorporated into some of the elements (marked in bold texts) of SCI_1's left-hand matrix by adding each element of SCI_11's second submatrix $Ge'_{11}$ to the element in the left-hand matrix $[G_1]$ corresponding to the same row/column nodes (e.g., elements $Ge'_{11}{}^{[11]}$ corresponding to the nodes n1/n1, $Ge'_{11}{}^{[12]}$ corresponding to the nodes n1/n2, $Ge'_{11}{}^{[13]}$ corresponding to the nodes n1/VDD, and $Ge'_{11}{}^{[14]}$ corresponding to the nodes n1/GND, are added to elements $Ge_1{}^{[11]}$ corresponding to the nodes n1/n1, $Gei_1{}^{[11]}$ corresponding to the nodes n1/n2, $Ge_1{}^{[13]}$ corresponding to the nodes n1/VDD, and $Ge_1{}^{[14]}$ corresponding to the nodes n1/GND, respectively). Also, SCI_11's second subvector $Ie'_{11}$ is incorporated into some of the elements (marked in bold texts) of SCI_1's right-hand vector by adding each element of SCI_11's second subvector $Ie'_{11}$ to the element in the right-hand vector $[I_1]$ corresponding to the same row node (e.g., elements $Ie'_{11}{}^{[1]}$ corresponding to the nodes "n1", $Ie'_{11}{}^{[2]}$ corresponding to the node "n2", $Ie'_{11}{}^{[3]}$ corresponding to the node VDD, and $Ie'_{11}{}^{[4]}$ corresponding to the node GND, are added to elements $Ie_1{}^{[1]}$ corresponding to the node "n1", $Ii_1{}^{[1]}$ corresponding to the node "n2", $Ie_1{}^{[3]}$ corresponding to the node VDD, and $Ie_1{}^{[4]}$ corresponding to the node GND, respectively).

Likewise, as shown in FIG. 6G, SCI_12's second submatrix $Ge'_{12}$ is incorporated into some of the elements (marked in bold texts) of SCI_1's left-hand matrix by adding each element of SCI_12's second submatrix $Ge'_{12}$ to the element in the left-hand matrix $[G_1]$ corresponding to the same row/column nodes (e.g., elements $Ge'_{12}{}^{[11]}$ corresponding to the nodes n2/n2, elements $Ge'_{12}{}^{[12]}$ corresponding to the nodes n2/out, $Ge'_{12}{}^{[13]}$ corresponding to the nodes n2/VDD, and $Ge'_{12}{}^{[14]}$ corresponding to the nodes n2/GND, are added to elements $Gi_1{}^{[11]}$ corresponding to the nodes n2/n2, $Gie_1{}^{[12]}$ corresponding to the nodes n2/out, $Gie_1{}^{[13]}$ corresponding to the nodes n2/VDD, and $Gie_1{}^{[14]}$ corresponding to the nodes n2/GND, respectively). Also, SCI_12's second subvector $Ie'_{12}$ is incorporated into some of the elements (marked in bold texts) of SCI_1's right-hand vector by adding each element of SCI_12's second submatrix $Ge'_{12}$ to the element in the right-hand vector $[I_1]$ corresponding to the same row node (e.g., elements $Ie'_{12}{}^{[1]}$ corresponding to the nodes "n2", $Ie'_{12}{}^{[2]}$ corresponding to the node out, $Ie'_{12}{}^{[3]}$ corresponding to the node VDD, and $Ie'_{12}{}^{[4]}$ corresponding to the node GND, are added to elements $Ii_1{}^{[1]}$ corresponding to the node "n2", $Ie_1{}^{[2]}$ corresponding to the node out, $Ie_1{}^{[3]}$ corresponding to the node VDD, and $Ie_1{}^{[4]}$ corresponding to the node GND, respectively).

In other words, the elements of SCI_1's left-hand matrix can be generated using its child SCIs' second submatrices as follows: $Ge_1{}^{[11]}=Ge'_{11}{}^{[11]}$, $Ge_1{}^{[12]}=0$, $Ge_1{}^{[13]}=Ge'_{11}{}^{[13]}$, $Ge_1{}^{[14]}=Ge'_{11}{}^{[14]}$, $Ge_1{}^{[21]}=0$, $Ge_1{}^{[22]}=Ge'_{12}{}^{[22]}$, $Ge_1{}^{[23]}=Ge'_{12}{}^{[23]}$, $Ge_1{}^{[24]}=Ge'_{12}{}^{[24]}$, $Ge_1{}^{[31]}=Ge'_{11}{}^{[31]}$, $Ge_1{}^{[32]}=Ge'_{12}{}^{[32]}$, $Ge_1{}^{[33]}=Ge'_{11}{}^{[33]}+Ge'_{12}{}^{[33]}$, $Ge_1{}^{[34]}=Ge'_{11}{}^{[34]}+Ge'_{12}{}^{[34]}$, $Ge_1{}^{[41]}=Ge'_{11}{}^{[41]}$, $Ge_1{}^{[42]}=Ge'_{12}{}^{[42]}$, $Ge_1{}^{[43]}=Ge'_{11}{}^{[43]}+Ge'_{12}{}^{[43]}$, $Ge_1{}^{[44]}=Ge'_{11}{}^{[44]}+Ge'_{12}{}^{[44]}$, $Gie_1{}^{[11]}=Ge'_{11}{}^{[21]}$, $Gie_1{}^{[12]}=Ge'_{12}{}^{[12]}$, $Gie_1{}^{[13]}=Ge'_{11}{}^{[23]}+Ge'_{12}{}^{[13]}$, $Gie_1{}^{[14]}=Ge'_{11}{}^{[24]}+Ge'_{12}{}^{[14]}$, $Gei_1{}^{[11]}=Ge'_{11}{}^{[12]}$, $Gei_1{}^{[21]}=Ge'_{12}{}^{[21]}$, $Gei_1{}^{[31]}=Ge'_{11}{}^{[32]}+Ge'_{12}{}^{[31]}$, $Gei_1{}^{[41]}=Ge'_{11}{}^{[42]}+Ge'_{12}{}^{[41]}$, and $Gei_1{}^{[11]}=Ge'_{11}{}^{[22]}+Ge'_{12}{}^{[11]}$. Also the elements of SCI_1's right-hand vector can be generated using its child SCIs' second subvectors as follows: $Ie_1{}^{[1]}=Ie'_{11}{}^{[1]}$, $Ie_1{}^{[2]}=Ie'_{12}{}^{[2]}$, $Ie_1{}^{[3]}=Ie'_{11}{}^{[3]}+Ie'_{12}{}^{[3]}$, $Ie_1{}^{[4]}=Ie'_{11}{}^{[4]}+Ie'_{12}{}^{[4]}$, and $Ii_1{}^{[1]}=Ie'_{11}{}^{[2]}+Ie'_{12}{}^{[1]}$.

FIG. 6H shows transformed matrix equation for the SCI_1 after Gaussian elimination, with extracted first and second submatrices $[Gie'_1]$ and $[Ge'_1]$, and first and second subvectors $[Ie'_1]$ and $[Ii'_1]$ of SCI_1. FIG. 6I shows the generated left-hand matrix $[G]$ and right-hand vector $[I]$ of SCI_2. FIG. 6J shows the transformed matrix equation for the SCI_2 after Gaussian elimination, with extracted first and second submatrices $[Gie'_2]$ and $[Ge'_2]$, and first and second subvectors $[Ie'_2]$ and $[Ie'_2]$ of SCI_2. In some embodiments, the second submatrix $[Ge'_1]$ and second subvector $[Ie'_1]$ of SCI_1, and the second submatrix $[Ge'_2]$ and second subvector $[Ie'_2]$ of SCI_2, are passed up the hierarchical level and used to generate the left-hand matrix and right-hand vector of top circuit 402, as shown in FIG. 7A.

Thus, in some embodiments, Equation (2) for an SCI's can be formed after the submatrices and subvectors of each of its child SCI(s) have been obtained by incorporating the second submatrix $Ge'$ and second subvector $Ie'$ of each of its child SCI(s). When there are multiple child SCIs, the process to obtain the submatrices and subvectors for each child SCI can be carried out independently before, after, or in parallel with the processes to obtain the submatrices and subvectors for each of the other child SCIs. In other words, in some embodiments, an SCI has calculation dependency on its child SCIs, but there is no calculation dependency among the child SCIs.

Referring back to FIG. 3A, in some embodiments, method 300 further includes, in each iteration round of the series of iteration rounds, computing (360) circuit equation parameters for the top circuit and solving (362) the top circuit's circuit equation to determine the top circuit's signal values. In some embodiments, computing (360) circuit equation parameters for the top circuit includes incorporating the $2^{nd}$ submatrices and $2^{nd}$ subvectors of each of the SCIs in the first hierarchical level immediately under the top circuit. For example, FIG. 6K shows the matrix equation for top circuit 402, which includes a left-hand matrix G, signal vector V and a right hand vector I. Left-hand matrix G includes rows corresponding, respectively, to the top circuit's external ports (e.g., external ports "in," out, VDD, GND) and internal net(s) (e.g., internal net "n1"), and columns corresponding, respectively, to the top circuit's external ports (e.g., external ports "in," out, VDD, GND) and internal net(s) (e.g., internal net "n1"). Right hand vector I includes a set of elements corresponding, respectively, to the top circuit's external ports (e.g., external ports "in," out, VDD, GND) and internal net(s) (e.g., internal net "n1"). In some embodiments, each element in the left-hand matrix G can be computed using the corresponding element in the left-hand matrix of each of the primitive devices (e.g., r1 and c1) of top circuit 402 and the corresponding element in the $2^{nd}$ submatrix of each SCI (e.g., SCI_1 and SCI_2) in the first hierarchical level immediately below top circuit 402. Likewise, each element in the right-hand matrix I can be computed using the corresponding element in the right-hand vector of each of the primitive devices (e.g., r1 and c1) of top circuit 402 and the corresponding element in the $2^{nd}$ subvector of each SCI (e.g., SCI_1 and SCI_2) in the first hierarchical level immediately below top circuit 402.

For example, FIG. 6L shows that parameters associated with primitive device r1 in top circuit 402 are incorporated into some of the elements (marked in bold texts) of the top circuit's left-hand matrix by adding each of r1's parameters to the corresponding elements (e.g., elements corresponding to "n1" and "in," which are nodes on both sides of r1) in the left-hand matrix G and right-hand vector I of top circuit 402. FIG. 6M shows that parameters associated with primitive device c1 in top circuit 402 are incorporated into some of the elements (marked in bold texts) of the top circuit's left-hand matrix by adding each of c1's parameters to the corresponding elements (e.g., elements corresponding to "n1" and GND, which are nodes on both sides of c1) in the left-hand matrix G and right-hand vector I of top circuit 402.

FIG. 6N shows SCI_1's second submatrix $Ge'_1$ is incorporated into some of the elements (marked in bold texts) of the top circuit's left-hand matrix [G] by adding each element of SCI_1's second submatrix $Ge'_1$ to the corresponding element in the left-hand matrix [G] (e.g., elements $Ge'_1{}^{[11]}$ corresponding to the row/column n1/n1, $Ge'_1{}^{[12]}$ corresponding to the row/column n1/out, $Ge'_1{}^{[13]}$ corresponding to the row/column n1/VDD, and $Ge'_1{}^{[14]}$ corresponding to the row/column n1/GND, are added to elements $G^{[22]}$ corresponding to the row/column n1/n1, $G^{[23]}$ corresponding to the row/column n1/out, $G^{[24]}$ corresponding to the row/column n1/VDD, and $G^{[25]}$ corresponding to the row/column n1/GND, respectively, and so on). FIG. 6N also shows SCI_1's second subvector $Ie'_1$ is incorporated into some of the elements (marked in bold texts) of the top circuit's right-hand matrix [I] by adding each element of SCI_1's second subvector $Ie'_1$ to the corresponding element in the right-vector matrix [I] (e.g., elements $Ie'_1{}^{[1]}$ corresponding to the row n1, $Ie'_1{}^{[2]}$ corresponding to the row out, $Ie'_1{}^{[3]}$ corresponding to the row VDD, and $Ie'_1{}^{[4]}$ corresponding to the row GND, are added to elements $I^{[2]}$ corresponding to the row n1, $I^{[3]}$ corresponding to the row out, $I^{[4]}$ corresponding to the row VDD, and $I^{[5]}$ corresponding to the GND, respectively, and so on).

FIG. 6O shows SCI_2's second submatrix $Ge'_2$ is incorporated into some of the elements (marked in bold texts) of the top circuit's left-hand matrix [G] by adding each element of SCI_2's second submatrix $Ge'_2$ to the corresponding element in the left-hand matrix [G] (e.g., elements $Ge'_2{}^{[11]}$ corresponding to the row/column VDD/VDD, AND $Ge'_2{}^{[12]}$ corresponding to the row/column VDD/GND are added to elements $G^{[44]}$ corresponding to the row/column VDD/VDD, $G^{[45]}$ corresponding to the row/column VDD/GND, respectively, and so on). FIG. 6O also shows SCI_2's second subvector $Ie'_2$ is incorporated into some of the elements (marked in bold texts) of the top circuit's right-hand matrix [I] by adding each element of SCI_2's second subvector $Ie'_2$ to the corresponding element in the right-vector matrix [I] (e.g., elements $Ie'_2{}^{[1]}$ corresponding to the row VDD, and $Ie'_2{}^{[2]}$ corresponding to the row GND, are added to elements $I^{[4]}$ corresponding to the row VDD, $I^{[5]}$ corresponding to the row GND, respectively, and so on).

Referring back to FIG. 3A, in some embodiments, method 300 further includes, in each iteration round of the series of iteration rounds, computing (360) circuit equation parameters for the top circuit and solving (362) the top circuit's circuit equation to determine the top circuit's signal values. Using the hierarchical circuit simulation approach according to some embodiments, the dimensions of the matrix equation for the top circuit is much smaller than the flattened whole circuit because matrix equation for the top circuit only includes parameters associated with the top circuit's external ports and the internal nets between its primitive devices and the SCIs in the first hierarchical level immediately below the top circuit. Furthermore, the elements in the top circuit's left-hand matrix and right-hand vector can determined by incorporating the second submatrix and second subvector of each of the SCI(s) in the first level, as discussed above. Thus, given the signal values at some of the top circuit's external ports (e.g., $V^{[1]}$ corresponding to external port "in"), the signal values at others of the top circuit's external ports (e.g., $V^{[3]}$ corresponding to external port "out," $V^{[4]}$ corresponding to external port VDD, and $V^{[5]}$ corresponding to external port GND) and its internal net(s) (e.g., $V^{[2]}$ corresponding to internal net "n1") can be readily solved using the top circuit's matrix equation by one or more processors in computer system 100 or 150.

In some embodiments, at least some of the signal values of the top circuit are passed down to the next hierarchical levels and used to determine some of the signal values for the SCIs in the next hierarchical level, at least some of which are then passed down and used to determine the signal values for the SCI's in the hierarchical level below the next hierarchical level, and so on. As shown FIG. 3A, method 300 further includes, in each iteration round of the series of iteration rounds, a top-down process (370) that determine lower-level SCI's signal values using the signal values passed down from higher-level SCIs (or top circuit), starting from the first hierarchical level and moving down the hierarchy one level at a time.

Figure 3D:
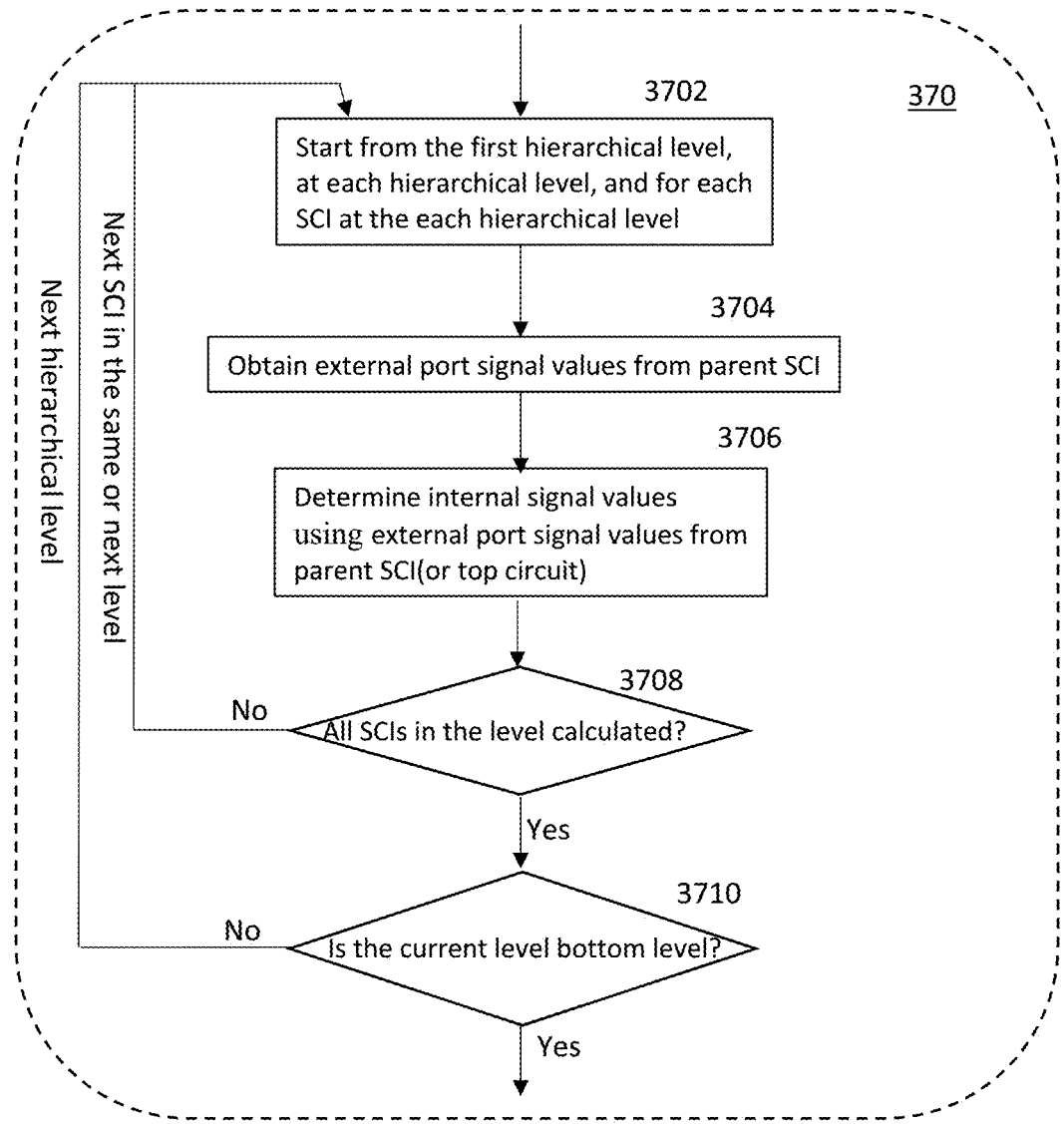

As shown in FIG. 3D, according to some embodiments, process 370 performs circuit calculation on each SCI in the netlist, starting (3702) from the first level of the hierarchy and moving down the hierarchy one level at a time. For each SCI at a particular level, process 370 includes obtaining (3704) signal values of the SCI's external ports from the SCI's parent SCI (or the top circuit), and determining (3706) the signal values of the SCI's internal nets using the external ports' signal values. Process 370 then proceeds to determine (3708) whether signal values for all of the SCIs in the current level have been calculated. If not all SCIs in the current level have had their signal values calculated, process 370 then moves to the next SCI in the same level and repeats steps 3704 and 3706 for the next SCI. If signal values for all of the SCIs in the current level have been calculated for the current iteration round, process 370 proceeds to determine whether the current level is the bottom level (or whether no other level(s) are below the current level). If the current level is not the bottom level, process 370 moves to the next hierarchical level and repeats steps 3704 and 3706 for each SCI in the next hierarchical level. Otherwise, process 370 completes and process 300 continues to determine (380) whether the current iteration round is the last iteration round, and repeats processes 350, 360/362, and 370 for the next iteration round if the current iteration round is not the last iteration round.

Figure 7B:
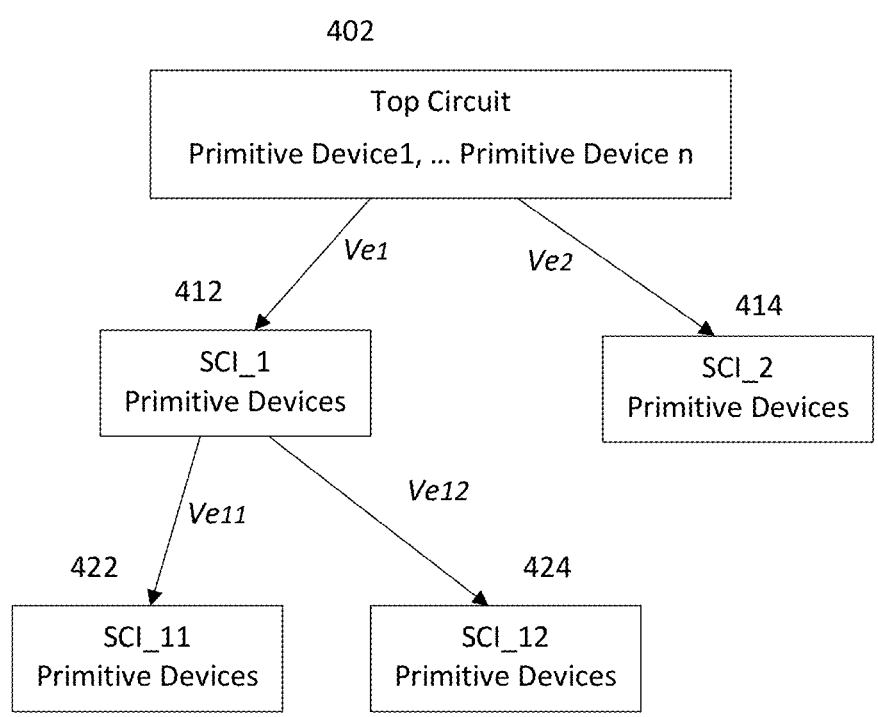
FIG. 7B illustrates a top-down process, according to some embodiments.

For example, for the hierarchical circuit 400, signal vector V in the matrix equation shown in FIG. 6K for top circuit 402 include signal values at nodes "n1", "out," VDD and GND. Nodes "n1", "out," VDD and GND happen to be the external ports of SCI_1, and nodes VDD and GND happen to be the external ports of SCI_2. Thus, the signal values at "n1", "out" VDD, and GND correspond to the signal values in subvector $[Ve_1]$, the signal values at VDD, and GND also correspond to the signal values in subvector $[Ve_2]$. In some embodiments, as shown in FIG. 7B, the signal values at "n1", "out" VDD, and GND, which correspond to the signal values in subvector $[Ve_1]$, are passed down the hierarchy and used to calculate the signal values $[Vi_1]$ at the internal net(s) of SCI_1 using equation 4(a). Likewise, as also shown in FIG. 7B, the signal values at VDD and GND, which correspond to the signal values in subvector $[Ve_2]$, are passed down the hierarchy and can be used to calculate the signal values $[Vi_2]$ at the internal net(s) of SCI_2 (if there is any) using equation 4(a).

In this example, SCI_2 does not have any internal net. SCI_1 has an internal net "n2," which is an external port for SCI_11 and SCI_12 at next level below. In some embodiments, as shown in FIG. 7B, the signal values at "n1", "n2" VDD, and GND, which correspond to the signal values in subvector $[Ve_{11}]$, are passed down the hierarchy and can be used to calculate the signal values $[Vi_{11}]$ at the internal net(s) of SCI_11 (if there is any) using equation 4(a). Likewise, as also shown in FIG. 7B, the signal values at "n2," "out," VDD and GND, which correspond to the signal values in subvector $[Vel_2]$, are passed down the hierarchy and can be used to calculate the signal values $[Vi_{12}]$ at the internal net(s) of SCI_12 (if there is any) using equation 4(a).

Figure 8A:
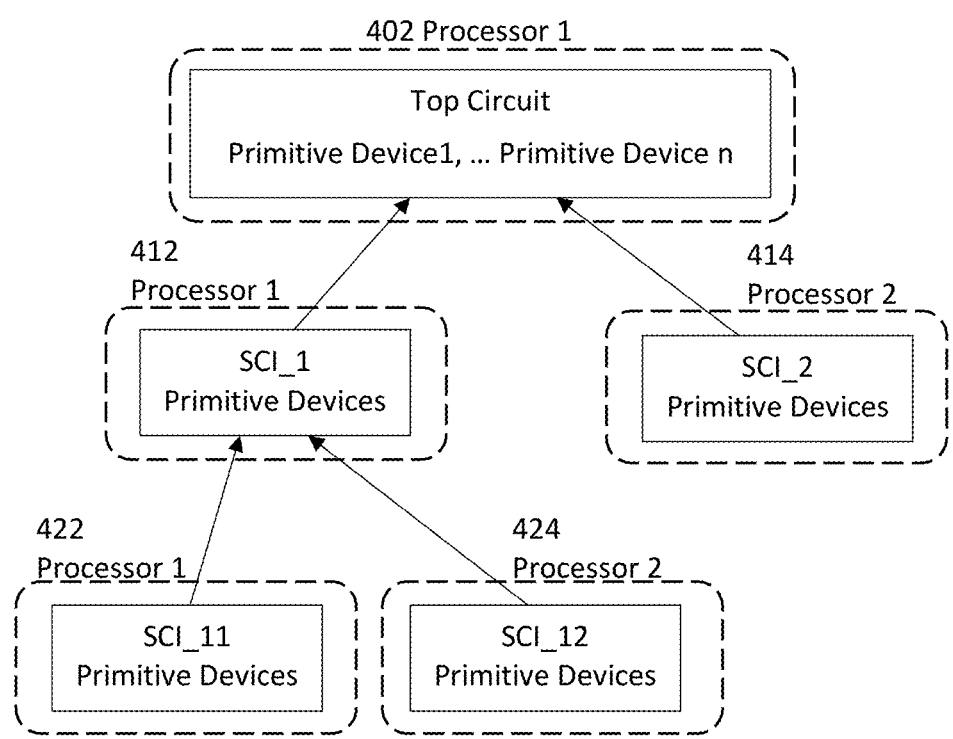
FIGS. 8A and 8B illustrate hierarchical circuit simulation using parallel processing, according to some embodiments.

In some embodiments, the matrices/vectors and submatrices/subvectors of different SCIs' in hierarchical circuit 400, as illustrated in FIGS. 6A through 6O, can be computed in different processors/computers. For example, as shown in FIG. 8A, a first processor (e.g., processor 1) in a first computer can be assigned to compute the submatrices/subvectors of SCI_11, while a second processor (e.g., processor 2) in the first or a second computer may be assigned to compute the submatrices/subvectors of SCI_12. The second processor (e.g., processor 2) may pass the second submatrix/subvector of SCI_12 to the first processor (e.g., processor 1), which would incorporate the second submatrices/subvectors of SCI_11 and SCI_12 into SCI_1, and compute the submatrices/subvectors of SCI_1. The second processor (e.g., processor 2) may compute the submatrices/subvectors of SCI_2 at about the same time when the submatrices/subvectors of SCI_1 is computed. The second processor (e.g., processor 2) can then provide the second submatrices/subvectors of SCI_2 to the first processor (e.g., processor 1) to compute the left-hand matrix and right-hand vector of the top circuit 402.

Figure 8B:
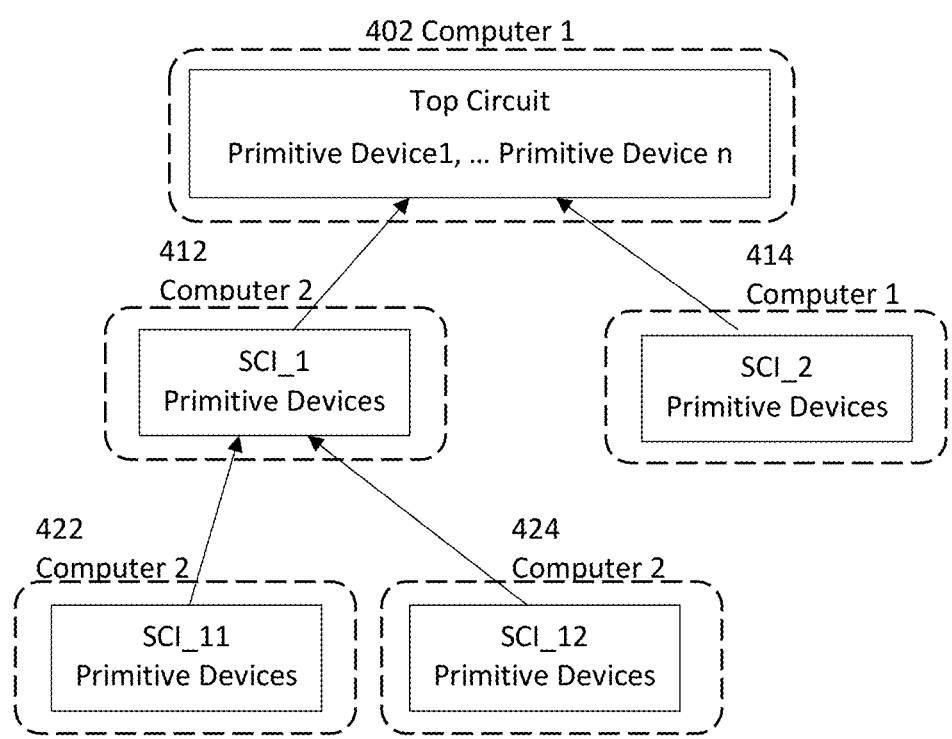

As another example, as shown in FIG. 8B, the second processor (e.g., processor 2) can be assigned to compute the submatrices/subvectors of SCI_11, SCI_12 and SCI_1, while the first processor (e.g., processor 1) may be assigned to compute the submatrices/subvectors of SCI_2 and the top circuit.

Figure 9:
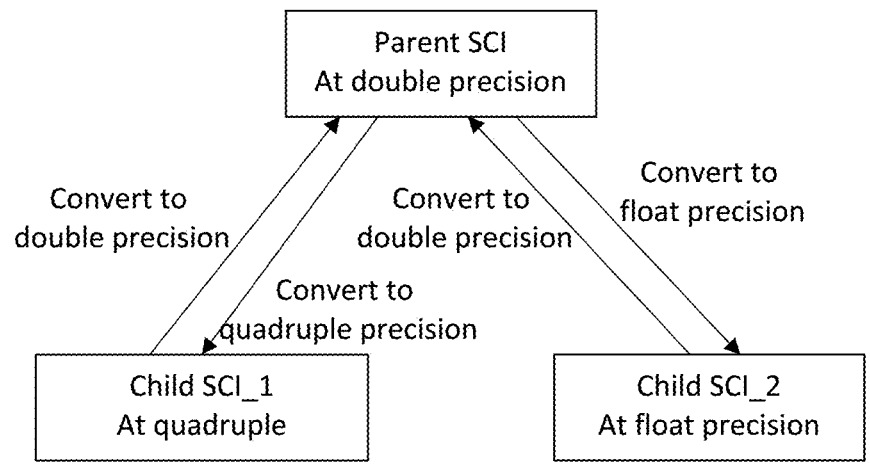
FIG. 9 illustrates a hierarchical circuit having SCIs with different preset value precisions as an example.

Circuit equation parameters (and/or signal values) of different sub-circuit instances (SCIs) in a netlist (e.g., netlist 400) are computed with different value precisions, which can be preset for the SCIs based on, for example, user inputs and/or complexities of the different circuit topologies. Thus, some SCIs are calculated at higher precision for accuracy and convergence than other SCIs. For example, as shown in FIG. 9, the plurality of SCIs in a netlist (e.g., netlist 400) may include a child SCI (e.g., child SCI_1) having a first circuit topology, a parent SCI of child SCI_1 having a second circuit topology, and another child SCI of the parent SCI (e.g., child SCI_2) having a third topology. In some embodiments, circuit equation parameters (e.g., first and second submatrices, and first and second subvectors) for child SCI_1 are computed with a first value precision (e.g., quadruple precision, or 128-bit precision), circuit equation parameters for the parent SCI are computed with a second value precision (e.g., double precision, or 64-bit precision), and circuit equation parameters for child SCI_2 are computed with a third value precision (e.g., float precision, or 32-bit precision).

In some embodiments, when a child SCI and it's parent SCI are computed at different precisions, precision conversion is used when passing the second submatrix and second subvector of the child SCI to its parent SCI and when passing signal values from the parent SCI to the child SCI. As discussed above, circuit equation parameters for child SCI_1 are computed or otherwise obtained before circuit equation parameters for the parent SCI. As shown in FIG. 9, a second portion of the circuit equation parameters (e.g., second submatrix and second subvector) for child SCI_1 are converted from the first value precision (e.g., quadruple precision) to the second value precision (e.g., double precision) before being used to obtain some of the circuit equation parameters for the parent SCI. Likewise, circuit equation parameters for child SCI_2 are computed or otherwise obtained before circuit equation parameters for the parent SCI, and a second portion of the circuit equation parameters (e.g., second submatrix and second subvector) for child SCI_2 are converted from the third value precision (e.g., float precision) to the second value precision (e.g., double precision) before being used to obtain some of the circuit equation parameters for the parent SCI.

In some embodiments, signal values at internal nets of child SCI_1 are determined with the first value precision (e.g., quadruple precision), signal values at internal nets of the parent SCI are determined with a second value precision (e.g., double precision). Thus, as shown in FIG. 9, one or more first signal values of the parent SCI are converted from the second value precision (e.g., double precision) to the first value precision (e.g., quadruple precision) before being used to compute the signal values at the internal nets of the child SCI_1. The one or more first signal values of the parent SCI correspond, respectively, to one or more signal values at external ports of the child SCI_1. Likewise, one or more second signal values of the parent SCI are converted from the second value precision (e.g., double precision) to the third value precision (e.g., float precision) before being used to compute the signal values at the internal nets of the child SCI_2. The one or more first signal values of the parent SCI correspond, respectively, to one or more signal values at external ports of the child SCI_2.

Figure 10A:
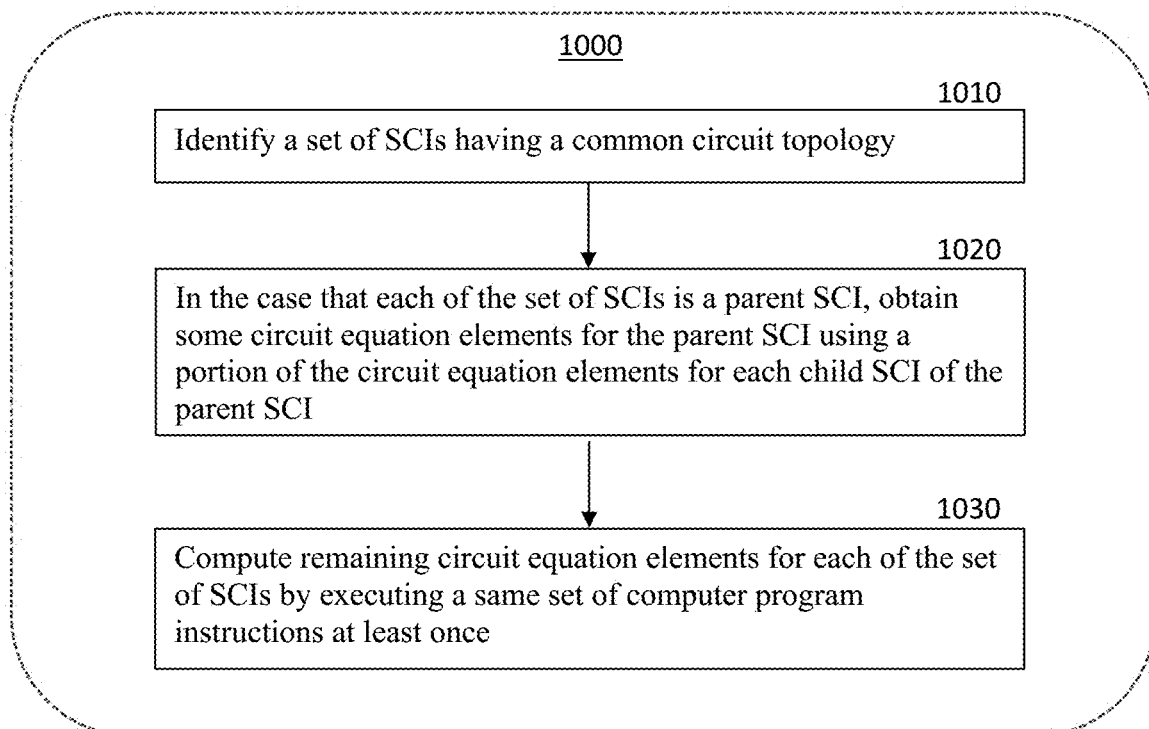
FIG. 10A is a flowchart illustrating a process of using a single set of computer program instructions to compute circuit equation parameters for a set of SCIs having a common circuit topology in accordance with some embodiments.
Figures 11A, 11B:
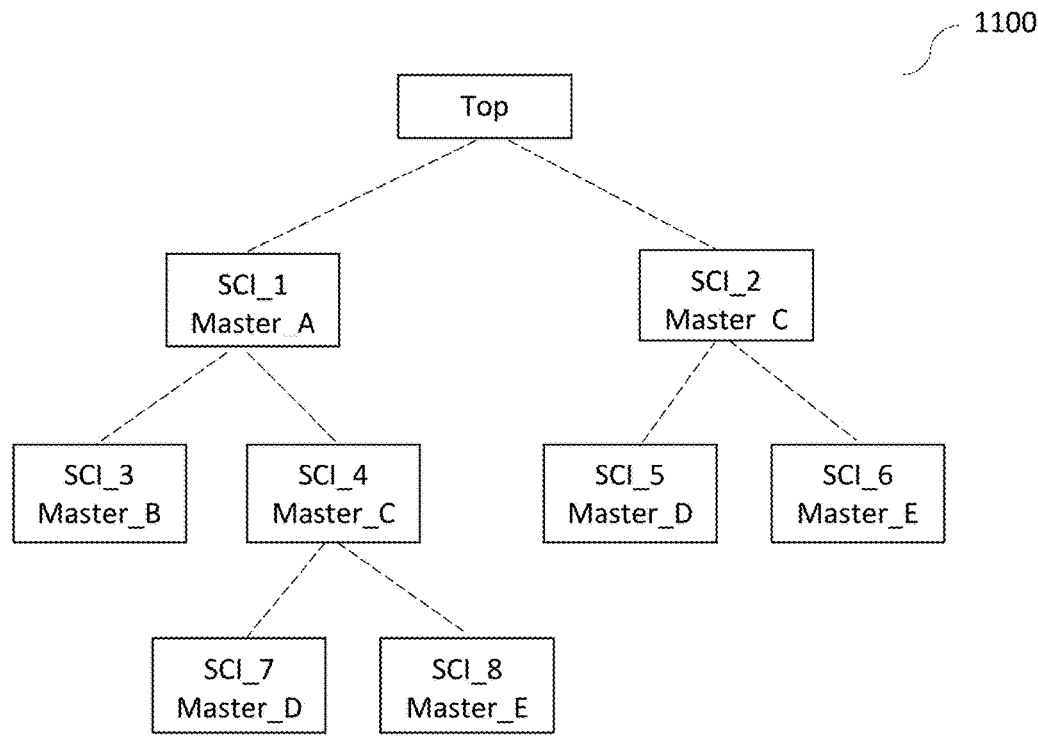
FIG. 11A illustrates a hierarchical circuit including one or more sets of SCIs, each set of SCIs having a common circuit topology in accordance with some embodiments.
FIG. 11B illustrates matrices/vectors of circuit equations for two SCIs having a common circuit topology in accordance with some embodiments.

In some embodiments, the plurality of SCIs in the netlist (e.g., netlist 400) include at least one set of SCIs having a common circuit topology and/or sharing a common circuit master, and process 350 includes a subprocess 1000 for computing the circuit equation parameters of each such set of SCIs. As shown in FIG. 10A, subprocess 1000 includes identifying (1010) a set of SCIs having a common circuit topology, each of the set of SCIs bring either a leaf SCI or a parent SCI that has one or more child SCIs, circuit equation parameters for each of the one or more child SCIs having been obtained in the same iteration round (or step). As shown in FIG. 11A, in a circuit netlist 1100, a first set of SCIs having a common circuit topology and/or sharing a common circuit master (e.g., Master_D) can be, for example, SCI_5 and SCI_7, which are leaf SCIs, and a second set of SCIs having a common circuit topology and/or sharing a common circuit master (e.g., Master_E) can be SCI_6 and SCI_8, which are also leaf SCIs. After process 350 proceeds to the next level of the hierarchy (e.g., after circuit equation parameters for SCI_5 SCI_7, SCI_6 and SCI_8 at the bottom level of the circuit netlist 1100 have been obtained), a third set of SCIs having a common circuit topology and/or sharing a common circuit master (e.g., Master_C) can be SCI_2 and SCI_4, each of which is a parent SCI.

In some embodiments, as shown in FIG. 10A, in the case that each of the set of SCIs is a parent SCI, subprocess 1000 further includes obtaining (1020) some of the circuit equation parameters for the parent SCI using a portion of the circuit equation parameters (e.g., $2^{nd}$ submatrices and $2^{nd}$ subvectors) for each child SCI of the parent SCI.

In some embodiments, because the set of SCIs (e.g., SCI_2 and SCI_4) have a common circuit topology, their circuit equations tend to correspond with each other. For example, as shown in FIG. 11B, circuit equation parameters for SCI_2 (e.g., elements in left hand matrix $[G_2]$ and right hand vector $[V_2]$ correspond, respectively, to elements in left hand matrix $[G_4]$ and right hand vector $[V_4]$, although the corresponding elements may or may not have equal values. Furthermore, $[G_2]$ and $[G_4]$ tend to have the same sparseness (e.g., if the matrix element in the $i^{th}$ row and $j^{th}$ column of $[G_2]$ is zero, or $G_2^{ij}=0$, then the matrix element in the $i^{th}$ row and $j^{th}$ column of $[G_4]$ is also zero, or $G_4^{ij}=0$; and if the matrix element in the $m^{th}$ row and $n^{th}$ column of $[G_2]$ is not zero, or $G_4^{mn} \neq 0$, then the matrix element in the $m^{th}$ row and $n^{th}$ column of $[G_4]$ is also not zero, or $G_4^{mn} \neq 0$. Similarly, [V2} and [V4] also tend to have the same sparseness (e.g., if the $i^{th}$ component of $[V_2]$ is zero, then the $i^{th}$ component of $[V_4]$ is also zero; and if the $m^{th}$ component of $[V_2]$ is not zero, then the $m^{th}$ component of $[V_4]$ is also not zero. Thus, circuit equation parameters for the set of SCIs (e.g., SCI_2 and SCI_4) can be computed by executing or calling a same circuit equation computation function (e.g., a set of computer program instructions for computing the remaining circuit equation parameters for any one of the set of SCIs).

In some embodiments, subprocess 1000 further includes computing (1030) the remaining circuit equation parameters for each of the set of SCIs by executing the same set of computer program instructions at least once (i.e., by making at least one function call to the same circuit equation parameter computation function). In some embodiments, circuit equation parameters for a subset of one or more SCIs of the set of SCIs can be computed by executing the same set of computer program instructions once (i.e., by making a single function call to the same circuit equation parameter computation function). For example, corresponding circuit equation parameters of SCI_2 and SCI_4 can be computed together or in parallel during the same function call using two respective sets of inputs for SCI_2 and SCI_4, respectively. Thus, by incorporating subprocess 1000, process 350 can be carried out more speedily using less computer resources.

Figure 10B:
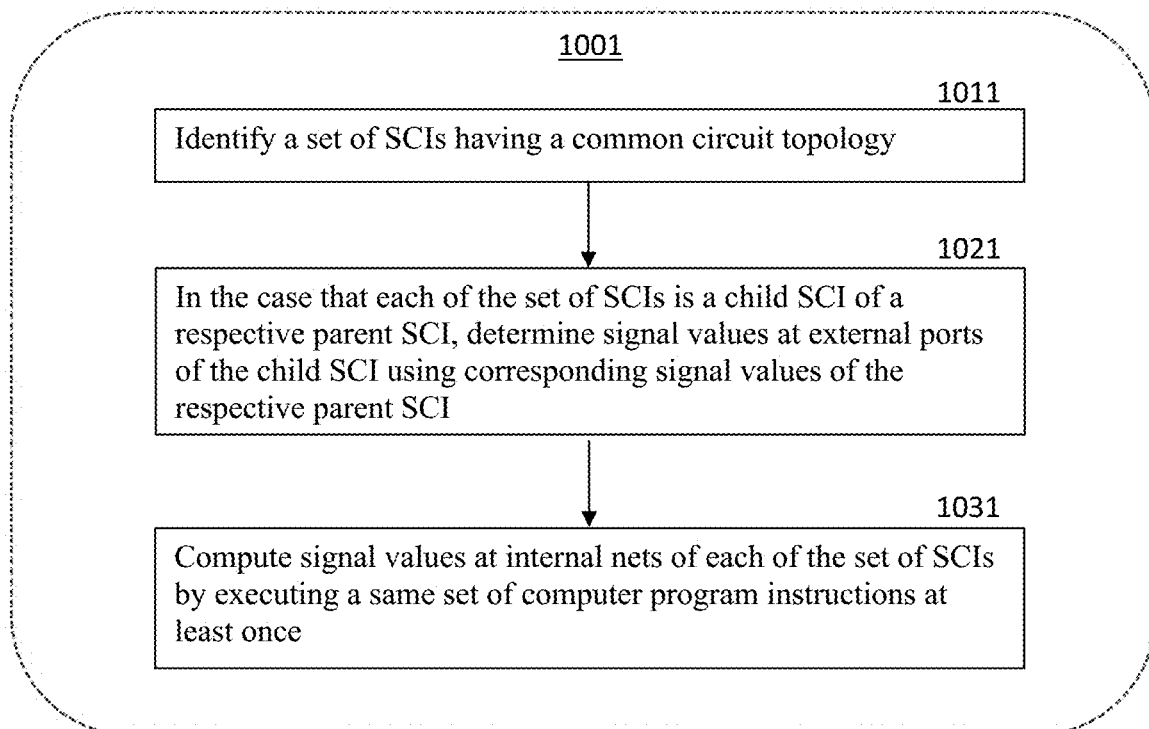
FIG. 10B is a flowchart illustrating a process of using a single set of computer program instructions to compute signal values for a set of SCIs having a common circuit topology in accordance with some embodiments.

In some embodiments, process 370 includes a subprocess 1001 for computing the signal values of a set of SCIs having a common topology. As shown in FIG. 10B, subprocess 1001 includes identifying (1011) a set of SCIs having a common circuit topology (e.g., SCI_6 and SCI_8). In the case that each of the set of SCIs is a child SCI of a respective parent SCI (e.g., SCI_6 being a child SCI of SCI_2, and SCI_8 being a child SCI of SCI_4), subprocess 1001 further includes determining (1021) signal values at external ports of the child SCI using corresponding signal values of the respective parent SCI.

In some embodiments, as discussed above, because the set of SCIs (e.g., SCI_6 and SCI_8) have a common circuit topology, their circuit equations tend to have a same structure. Thus, internal signal values for the set of SCIs (e.g., SCI_6 and SCI_8) can be computed by executing or calling a same signal value computation function (e.g., a set of computer program instructions for computing signal values at internal nets of any of the set of SCIs).

In some embodiments, subprocess 1001 further includes computing (1031) the signal values at internal nets of each of the set of SCIs by executing the same set of computer program instructions at least once (i.e., by making at least one function call to the same signal value computation function). In some embodiments, signal values at internal nets of a subset of one or more SCIs of the set of SCIs can be computed by executing the same set of computer program instructions once (i.e., by making a single function call to the same signal value computation function). For example, corresponding signal values can be computed together or in parallel with the same function call using two respective sets of inputs for SCI_6 and SCI_8, respectively. Thus, using subprocess 1001, process 370 can be carried out more speedily using less computer resources.

In some embodiments, as discussed above, a circuit netlist is represented by respective left-hand matrices and right-hand vectors of the respective SCIs of the plurality of SCIs, where a parent SCI and its child SCIs are considered as have their own respective left-hand matrices and right-hand vectors. As a result, circuit equation parameters for multiple child SCIs of a parent SCIs can be computed independently and concurrently, as discussed above.

Figure 12A:
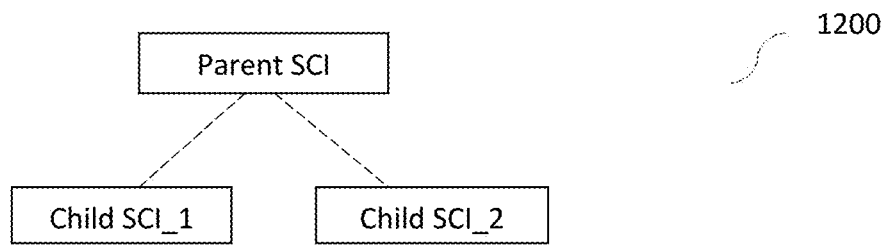
FIG. 12A illustrates a hierarchical circuit as an example.
Figure 12B:
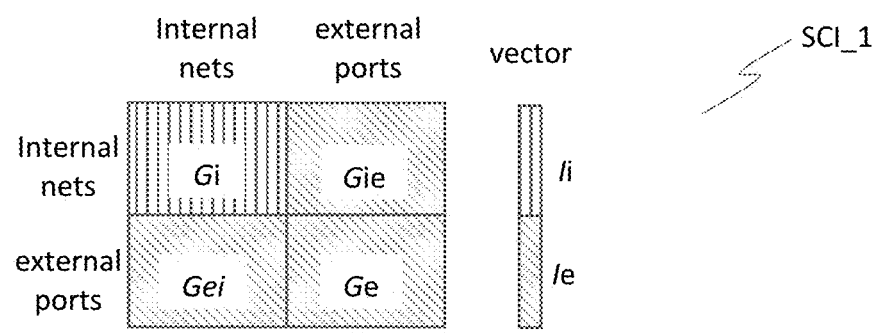
FIGS. 12B and 12C illustrate matrices/vectors of circuit equations for two child SCIs, respectively, in accordance with some embodiments.
Figure 12C:
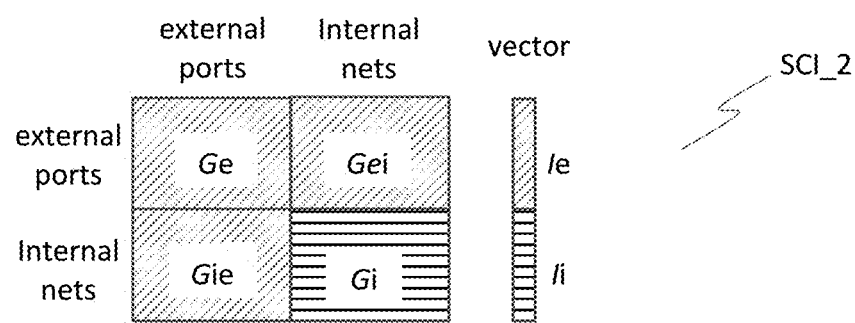

Alternatively, a circuit netlist can be represented by one global matrix and one global vector, while each SCI can logically (or virtually) have its matrix/vector, which contribute to the global matrix/vector. For example, for a circuit netlist 1200 shown in FIG. 12A, child SCI_1 logically or virtually can have its own matrix/vector, where internal nets and external ports are organized in respective submatrices/subvectors Gi, Gie, Gei Ge Ie and Ii, as shown in FIG. 12B, and child SCI_2 logically or virtually can have its own matrix/vector, where internal nets and external ports are organized in respective submatrices/subvectors as shown in FIG. 12C.

Figure 12D:
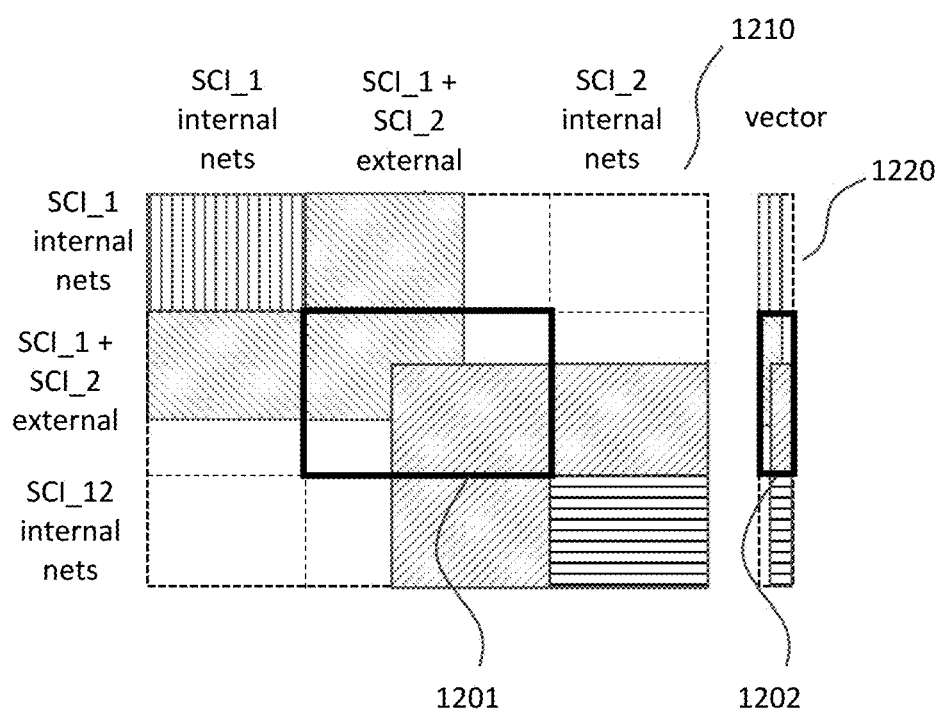
FIG. 12D illustrates a global matrix of a hierarchical circuit in accordance with some embodiments.

In some embodiments, as shown in FIG. 12D, Child SCI_1's matrix/vector and Child SCI_2's matrix/vector contribute to portions of a global matrix/vector 1210/1220 and thus can be used to obtain elements in the portions of the global matrix/vector 1210/1220. Thus, the logical or virtual matrices/vectors of the SCIs in the netlist can be computed using the method 300, as discussed above, except that, since the external ports of SCI_1 and the external ports of SCI_2 may overlap partially with each other in areas marked by bolded rectangles 1201 and 1202, respectively, circuit equation parameters for SCI_1 and SCI_2 in these areas cannot be accessed at the same time. Thus, circuit equation parameters for SCI_1 corresponding to these areas are not computed, or used to build the global matrix/vector 1210/1220, concurrently with circuit equation parameters for SCI2 corresponding to the same areas.

Thus, the methods according to some embodiments allow the computation of the circuit equations to be distributed across multiple processors in a single or multiple computer systems, which operate in parallel to perform the simulation. Furthermore, since the second submatrices and second subvectors of each SCI in the netlist are passed up the hierarchical levels and incorporated into the left-hand matrices and right-hand vectors of their respective parent SCIs or the top circuit, they do not need to be saved into memory 106 or storage 116 of the computer system(s) performing the calculation for the SCI. Thus, the methods according to certain embodiments provide faster simulation with significantly reduced memory requirements, making it possible to perform whole circuit simulation on very large-scale integrated circuits.

What is claimed is:

1. A method performed by one or more computer systems to simulate a circuit, each of the one or more computer systems including at least one processor, comprising:
   determining a top circuit and a plurality of sub-circuit instances (SCIs) from a netlist of the circuit, the plurality of SCIs forming a hierarchy under the top circuit such that each sub-circuit instance (SCI) of the plurality of SCIs is a parent SCI of one or more SCIs lower in the hierarchy and/or a child SCI of either the top circuit or another SCI higher in the hierarchy, each of the plurality of SCIs having external ports, at least one of the plurality of SCIs including internal nets; and
   during an iteration round of one or more iteration rounds:
      obtaining respective circuit equation parameters for each respective SCI of the plurality of SCIs and storing at least a first portion of the circuit equation parameters for the respective SCI in electronic memory, wherein circuit equation parameters for each respective parent SCI among the plurality of SCIs are obtained after circuit equation parameters for each respective child SCI of the respective parent SCI are obtained, and wherein some of the circuit equation parameters for the respective parent SCI are obtained using a second portion of the circuit equation parameters for the respective child SCI;
      determining signal values in the top circuit, the signal values including signal values at external ports of the top circuit and signal values at external ports of one or more child SCIs of the top circuit; and
      determining respective signal values of each respective SCI of the plurality of SCIs in the hierarchy, wherein, for each specific child SCI having internal nets, signal values at internal nets of the specific child SCI are obtained using one or more signal values of a parent SCI of the specific child SCI and a first portion of the circuit equation parameters for the specific child SCI, the one or more signal values of the parent SCI of the specific child SCI corresponding to one or more signal values at external ports of the specific child SCI.

2. The method of claim 1, wherein obtaining respective circuit equation parameters for each respective SCI of the plurality of SCIs comprises:
   identifying a set of SCIs having a common circuit topology, wherein circuit equation parameters for each child SCI of each of the set of SCIs have been obtained during the iteration round;
   for each particular SCI of the set of SCIs, obtaining some circuit equation parameters for the particular SCI using circuit equation parameters for each child SCI of the particular SCI; and
   executing a same set of computer program instructions to obtain remaining circuit equation parameters for each subset of the set of SCIs having the common circuit topology, wherein a subset of the set of SCIs includes one, some, or all of the SCIs in the set of SCIs.

3. The method of claim 2, wherein executing a same set of computer program instructions to obtain remaining circuit equation parameters for each subset of the set of SCIs having the common circuit topology comprises executing a same set of computer program instructions once to obtain remaining circuit equation parameters for each of two or more SCIs of the set of SCIs in parallel.

4. The method of claim 1, wherein determining respective signal values of each respective SCI of the plurality of SCIs in the hierarchy comprises:
   identifying a set of SCIs having a common circuit topology after signal values for a parent SCI of each of the set of SCIs having been obtained during the iteration round; and
   executing a same set of computer program instructions to compute signal values at internal nets of each SCI of the set of SCIs having the common circuit topology.

5. The method of claim 4, wherein executing a same set of computer program instructions to compute signal values at internal nets of each SCI of the set of SCIs having the common circuit topology comprises executing a same set of computer program instructions once to compute signal values at internal nets of each of two or more SCIs of the set of SCIs in parallel.

6. The method of claim 1, wherein obtaining respective circuit equation parameters for each respective SCI of the plurality of SCIs comprises obtaining first circuit equation parameters for a first SCI and obtaining second circuit equation parameters for a second SCI, the first circuit equation parameters having a first value precision and the second circuit equation parameters having a second value precision that is different from the first value precision.

7. The method of claim 6, wherein the first SCI is a child SCI of the second SCI, and wherein obtaining the second circuit equation parameters for the second SCI comprises converting a first portion of the first circuit equation parameters for the first SCI from the first value precision to the second value precision before using the first portion of the first circuit equation parameters to obtain some of the second circuit equation parameters for the second SCI.

8. The method of claim 1, wherein signal values at internal nets of a first SCI are determined with a first value precision and signal values at internal nets of a second SCI are determined with a second value precision that is different from the first value precision.

9. The method of claim 8, wherein the first SCI is a child SCI of the second SCI, and wherein determining respective signal values of each respective SCI of the plurality of SCIS in the hierarchy comprises converting and one or more signal values of the second SCI from the second value precision to the first value precision before using the one or more signals values of the second SCI to determine the signal values at the internal nets of the first SCI, the one or more signal values of the second SCI corresponding to one or more signal values at external ports of the first SCI.

10. The method of claim 1, wherein obtaining respective circuit equation parameters for each respective SCI of the plurality of SCIS comprises, obtaining circuit equation parameters for a second child SCI before or after obtaining circuit equation parameters for a first child SCI, and obtaining certain circuit equation parameters of a parent SCI of the first child SCI and the second child SCI by incorporating a portion of the circuit equation parameters for the first child SCI before or after incorporating a portion of the circuit equation parameters for the second child SCI, wherein circuit equation parameters corresponding to external ports of the first child SCI overlap partially with circuit equation parameters corresponding to external ports of the second child SCI.

11. The method of claim 1, wherein the second portion of the circuit equation parameters for the respective child SCI correspond to external ports of the respective child SCI.

12. The method of claim 1, obtaining respective circuit equation parameters for each respective SCI of the plurality of SCIs comprises obtaining respective first and second submatrices and respective first and second subvectors for respective circuit equations of each respective SCI of the plurality of SCIs.

13. The method of claim 1, wherein the one or more iteration rounds include other iteration rounds preceding the iteration round, and wherein, during the iteration round, obtaining respective circuit equation parameters for the respective SCI comprises determining whether the respective SCI is an active SCI, and in response to the respective SCI is not an active SCI, reusing circuit equation parameters obtained for the respective SCI in a prior iteration round.

14. The method of claim 13, wherein determining whether a respective SCI is active comprises determining whether any signal value of the respective SCI has changed more than a preset threshold during previous iteration rounds.

15. The method of claim 1, wherein the one or more iteration rounds include other iteration rounds preceding the iteration round, wherein, during the iteration round, obtaining respective circuit equation parameters for the respective SCI comprises determining whether the respective SCI is a leaf SCI, and in response to the respective SCI is a leaf SCI, determining whether the leaf SCI is an active SCI and has corresponding precalculated templates for computing circuit equation parameters, and in response to the respective SCI is an active SCI and has precalculated templates, computing the circuit equation parameters of the respective SCI using the precalculated templates.

16. The method of claim 15, wherein determining whether a respective SCI is an active SCI comprises determining whether any signal value of the respective SCI has changed more than a preset threshold during previous iteration rounds.

17. The method of claim 1, wherein:
obtaining circuit equation parameters for a first SCI is performed by a first processor;
obtaining circuit equation parameters for a second SCI is performed by a second processor distinct from the first processor, the first SCI and the second SCI sharing a common parent SCI or are in two different branches of the hierarchy;
obtaining circuit equation parameters for a third SCI is performed by the second processor or a third processor, and wherein a second portion of the circuit equation parameters for the third SCI is passed from the second or the third processor to the first processor, the third SCI being a child SCI of the first SCI.

18. A non-transitory computer readable medium storing therein computer program instructions, which, when executed by one or more processors, cause the one or more processors to perform the method of claim 1.

19. A system to simulate a circuit, comprising processors, wherein:
at least one processor among the processors is configured to determine a top circuit and a plurality of sub-circuit instances (SCIs) from a netlist of the circuit, the plurality of SCIs forming a hierarchy under the top circuit such that each sub-circuit instance (SCI) of the plurality of SCIs is a parent SCI of one or more SCIs lower in the hierarchy and/or a child SCI of either the top circuit or another SCI higher in the hierarchy, each of the plurality of SCIs having external ports, at least one of the plurality of SCIs including internal nets; and
at least some of the processors is configured to, during an iteration round of one or more iteration rounds, obtain respective circuit equation parameters for each respective SCI of the plurality of SCIs and store at least a first portion of the circuit equation parameters for the respective SCI in electronic memory, wherein circuit equation parameters for each respective parent SCI among the plurality of SCIs are obtained after circuit equation parameters for each respective child SCI of the respective parent SCI are obtained, and wherein some of the circuit equation parameters for the respective parent SCI are obtained using a second portion of the circuit equation parameters for the respective child SCI;
a first processor among the processors is configured to obtain, during the iteration round, first circuit equation parameters for a first SCI of the plurality of SCIs during the iteration round;
a second processor among the processors is configured to obtain second circuit equation parameters for a second SCI of the plurality of SCIs during the iteration round, the second SCI being a parent SCI of the first SCI;
the first processor is further configured to pass at least a second portion of the first circuit equation parameters to the second processor; and
the second processor is further configured to use the second portion of the first circuit equation parameters to obtain at least some of the second circuit equation parameters for the second SCI.

20. The system of claim 19, wherein:
at least one processor among the one or more processors is configured determine, during the iteration round, signal values in the top circuit, the signal values including signal values at external ports of the top circuit and signal values at external ports of one or more child SCIs of the top circuit;
at least some of the processors is configured to determine, during the iteration round, respective signal values of each respective SCI of the plurality of SCIs in the hierarchy, wherein, for a specific child SCI having internal nets, signal values at internal nets of the specific child SCI are obtained using one or more signal values of a parent SCI of the specific child SCI and a first portion of the circuit equation parameters for the specific child SCI, the one or more signal values of the parent SCI of the specific child SCI corresponding to one or more signal values at external ports of the specific child SC;

a third processor is configured to determine, during the iteration round, first signal values of the first SCI;

a fourth processor is configured to determine, during the iteration round, second signal values of the second SCI, and to pass at least one or more of the second signal values to the third processor, the one or more of the second signal values corresponding to one or more signal values at external ports of the first SCI; and the third processor is further configured to determine at least some of the first signal values of the first SCI using the one or more of the second signal values and a first portion of the first circuit equation parameters.

* * * * *